US006370510B1

(12) United States Patent
McGovern et al.

(10) Patent No.: US 6,370,510 B1
(45) Date of Patent: *Apr. 9, 2002

(54) EMPLOYMENT RECRUITING SYSTEM AND METHOD USING A COMPUTER NETWORK FOR POSTING JOB OPENINGS AND WHICH PROVIDES FOR AUTOMATIC PERIODIC SEARCHING OF THE POSTED JOB OPENINGS

(75) Inventors: Robert J. McGovern, Potomac, MD (US); James A. Winchester, Jr., Reston, VA (US); Andrew B. Evans, Alderson, WV (US); Brian E. Farmer; Jennie A. Koffman, both of Reston, VA (US); Aaron P. Walker, Vienna, VA (US)

(73) Assignee: CareerBuilder, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/389,752

(22) Filed: Sep. 7, 1999

Related U.S. Application Data

(63) Continuation of application No. 08/853,376, filed on May 8, 1997, now Pat. No. 5,978,768.

(51) Int. Cl.[7] .............................................. G06F 17/60
(52) U.S. Cl. .......................................................... 705/1
(58) Field of Search ................................ 705/2, 10, 26, 705/27; 707/10, 104; 709/201, 203, 219

(56) References Cited

U.S. PATENT DOCUMENTS

| 4,389,679 A | 6/1983 | Missan et al. |
| 4,654,793 A | 3/1987 | Elrod |
| 4,937,743 A | 6/1990 | Rassman et al. |
| 5,086,394 A | 2/1992 | Shapira |
| 5,111,391 A | 5/1992 | Fields et al. |

(List continued on next page.)

FOREIGN PATENT DOCUMENTS

JP          410228476 A   *   8/1998

OTHER PUBLICATIONS

Kennedy, Joyce Lain, "The job search goes computer", Journal of career Planning & Employment (ICPE), v55, n1, p42–46, 1994.*
Overman Stephenie, "Cruising cyberspace for the best recruits", HRMagazine v40 n2 p52–55. Feb. 1995.*
Website address www.monsterboard.com.
Website address www.occ.com.
Website address www.bestrecruit.com.

(List continued on next page.)

*Primary Examiner*—Vincent Millin
*Assistant Examiner*—Hani M. Kazimi
(74) *Attorney, Agent, or Firm*—Roylance, Abrams, Berdo & Goodman, LLP

(57) ABSTRACT

A method and apparatus for providing an interactive computer-driven employment recruiting service. The method and apparatus enables an employer to advertise available positions on the Internet, directly receive resumes from prospective candidates, and efficiently organize and screen the received resumes. The method and apparatus further is capable of monitoring employment advertisements for a job seeker and automatically notifying the job seeker when a position for which the job seeker is suitable becomes available. The method and apparatus further enables a plurality of companies to advertise job positions at a single location accessible via the Internet by a job seeker, and enables the job seeker to communicate directly with a company via the Internet if the job seeker is interested in exploring further information pertaining to an available position at that company.

12 Claims, 31 Drawing Sheets

U.S. PATENT DOCUMENTS

| | | | |
|---|---|---|---|
| 5,117,353 | A | 5/1992 | Stipanovich et al. |
| 5,164,897 | A | 11/1992 | Clark et al. |
| 5,197,004 | A | 3/1993 | Sobotka et al. |
| 5,243,515 | A | 9/1993 | Lee |
| 5,301,105 | A | 4/1994 | Cummings, Jr. |
| 5,305,195 | A | 4/1994 | Murphy |
| 5,416,694 | A | 5/1995 | Parrish et al. |
| 5,426,780 | A | 6/1995 | Gerull et al. |
| 5,444,320 | A | 8/1995 | Konard |
| 5,500,793 | A | 3/1996 | Deming, Jr. et al. |
| 5,506,984 | A | 4/1996 | Miller |
| 5,592,375 | A | 1/1997 | Salmon et al. |
| 5,600,554 | A | 2/1997 | Williams |
| 5,671,409 | A * | 9/1997 | Fatseas et al. .............. 707/104 |
| 5,758,324 | A * | 5/1998 | Hartman et al. ................ 705/1 |
| 5,832,497 | A * | 11/1998 | Taylor ......................... 707/104 |
| 5,884,270 | A * | 3/1999 | Walker et al. .................. 705/1 |
| 5,884,272 | A * | 3/1999 | Walker et al. .................. 705/1 |
| 6,026,403 | A * | 2/2000 | Siefert .......................... 707/10 |

OTHER PUBLICATIONS

Website address www.resumix.com.
Website address www.corpsites.com.
Website address www.hotjobs.com.
Website address www.futurestep.com.
Website address www.easysabre.com.
Clyde et al. An Object Oriented Implementation of an Adaptive Classification of Job Openings, IEEE, pp. 9–16, Feb. 1995.
Belanger et al. Employment Interview Information Available Online, vol. 10, No. 1 Online Reviews, pp. 45–56, Feb., 1986.
Dolan et al., Top US Sources for an Online Job. Database, pp. 35–43, Nov., 1994.
Martin L. Ramsay, The USA at your Fingertips, p. 89, Jun., 1993.
Eric R. Chabrow, Online Employment, pp. 38–40, Jan., 1995.
APS Related information, pp. 3–2, 3–3, 4–3, 4–4, 4–12, 4–26, 4–31, 4–32, 4–36.
Harry Newton, Resume: Resume Announces Internet Services, Work–Group Computing, pp. 1–3, Jun., 1995.
Marianne K. McGee, Help wanted? Find it Online, Information Week, pp. 1–2, Jun., 1995.
Riley, Resume Database on the Internet, The Riley Guide, pp. 1–5, 1995.
MCI Communications Corporation, "MCI, Job and resumes posting related information".
Sullivan, Kristina B., Vendors to Push Multimedia Wares at CD ROMs Show (PC Week), Oct., 1991, p.28.
Website address www.intellimatch.com.
Wedsite address www. joboptions.com.
Website address www.headhunternet.com.
Website address www.careerpath.com.
Website address www.dice.com.
Wedsite address www.careerweb.com.
Website address www.nationjob.com.

* cited by examiner

FIG. 12

Web & Company Settings

| Settings Password | Company Pages | Data Aging | Position Detail | License Key |
| Overall Web Settings | | | | Auto-Acknowledge |

Choose a style template for your TeamBuilder Web Page:

Fun ▽

Enter your company's name as you wish it to appear on the Web

Shenandoah Cycles

☑ Put an additional comment on the page (company slogan, etc.)

Put it in gear!

Your Company

☑ Show a company logo image on TeamBuilder Web page:

bike.gif    <<Import

☐ Provide an Internet e-mail address for questions and comments:

<<Address Book

OK    Cancel    Apply    Help

| Resume Scoring and Notes | | ✕ |
|---|---|---|
| Is the candidate suitable?   ☐ The candidate has been interviewed | | OK |
| ○ Not yet determined   Interview date  6/12/96 | | Cancel |
| ✕ ○ No | | |
| ? ○ Maybe   ◉ Auto-delete this resume when aged | | Help |
| ☆ ◉ Yes   ○ Save this resume indefinitely | | |
| Auto-acknowledgment status: Sent | | |
| Notes | | |

| Find Resumes | |
|---|---|

Only return resumes received for positions in the following job category:

| Sales ▽ |

[Find]
[Cancel]
[Help]

Keywords to look for in the resume text (can be left blank)

| falls church |

⟵ 252

◉ Return resumes that match ANY keyword
○ Only return resumes that match ALL keywords Only return resumes with the following score:

○ Any score
   ○ Unscored
✗ ○ No
? ○ Maybe
☆ ◉ [Yes]

☐ Only return resumes received later than:

| 7/12/96 |

EMPLOYMENT RECRUITING SYSTEM AND METHOD USING A COMPUTER NETWORK FOR POSTING JOB OPENINGS AND WHICH PROVIDES FOR AUTOMATIC PERIODIC SEARCHING OF THE POSTED JOB OPENINGS

This is a continuation of U.S. patent application Ser. No. 08/853,376 filed on May 8, 1997, now U.S. Pat. No. 5,978,768 the entire contents of which is incorporated herein by reference.

FIELD OF THE INVENTION

The present invention relates to a method and apparatus for providing an interactive computer-driven employment recruiting service. More specifically, the present invention relates to a method and apparatus which enables an employer to use a computer network, such as the Internet, to advertise available positions and receive resumes electronically from prospective applicants, and enables prospective applicants to use the Internet to find those available positions.

BACKGROUND OF THE INVENTION

Many resources are presently available to assist businesses in finding suitable candidates to fill available positions. Perhaps the most common recruiting method is direct advertising by employers in the employment section of a newspaper, or in a magazine that is targeted to people having specific skills (e.g., engineers, attorneys, computer programmers, and so on). A typical employment advertisement will generally include a brief description of the available position, along with the address, telephone number, facsimile number and/or e-mail address of the employer. Applicants can apply for the advertised position by sending their resumes directly to the employer by facsimile, regular mail or e-mail. An employer will usually have a person in its employment or human resources department screen the resumes to identify the applicants best suited for the position.

Many disadvantages are inherent in this conventional recruiting method. For instance, a magazine and especially, a newspaper, has a limited amount of subscribers and generally services only a limited region. Therefore, the company's advertisement may never be seen by many qualified people outside of that region. In order to distribute the advertisement more universally, it may be necessary for the employer to run the advertisement in several newspapers or magazines, thus substantially increasing the advertising expense incurred by the company.

Furthermore, this conventional method is also very inefficient even after the resumes are received by the company. For example, because the resumes must be manually organized and screened, a person in the company's recruitment or human resources department may need to spend a significant amount of time every day performing this task. In a large corporation having many positions becoming available on a daily basis, it may be necessary for several people to devote most of their time to organizing and screening applicants' resumes. Furthermore, because a large amount of resumes may be received, the task of organizing and screening those resumes may be particularly onerous and thus, a certain resume may be overlooked or mishandled. As a result, a candidate who is well suited for a position may never be considered.

In an attempt to increase the scope of their advertising, some companies have begun using computer networks, such as the Internet, to post employment opportunities. For instance, a company may set up its own "home page" on the World Wide Web (the "Web") on which various job openings can be posted. Anyone who subscribes to the internet can thus access or "log on" to that company's home page, determine which positions at that company are available, and send a resume to the company via regular mail, facsimile or e-mail.

Although a home page can be a useful tool in enabling a company to expand its advertising capabilities, a home page provides no mechanism for organizing or screening resumes that are received. The received resumes still must be organized and screened by a person in the company's human resources department in the traditional manner. Hence, the possibility still exists that a resume will be overlooked or mishandled.

Furthermore, in order for an applicant to see the company's advertisement, the applicant must be aware that the company exists and has a home page on the Web. Hence, if the applicant has never heard of the company, the applicant would not be aware that that company has a home page. Many highly qualified candidates therefore may overlook a company's advertisement because they simply are not aware that the company exists.

Several advertisement agencies have recognized these potential shortcomings and have developed "career bulletin boards" on the Web. A career bulletin board, such as CareerMosaic, MonsterBoard, and the like, is an electronic bulletin board on which messages can be "posted" as on a conventional bulletin board. A career bulletin board is advantageous because it provides a single location at which many companies can post employment opportunities. A job seeker can log onto the bulletin board to peruse the posted available positions. However, several problems are inherent with career bulletin boards.

For example, if a company wants a job seeker to see complete descriptions of their job openings, the company must send those complete descriptions directly to the bulletin board provider. The computer at the site of the bulletin board provider must store all of the company's information and thus, must have access to a large amount of memory.

Furthermore, the computer must be capable of continuously accessing that information to display it on the bulletin board. These accessing and displaying operations, which involve the handling of large amounts of data, may slow the computer's operation significantly. As a consequence, if many job seekers are accessing the bulletin board at the same time, the computer may be incapable of handling this high level of activity. Hence, additional job seekers may be unable to access the bulletin board at that time, or job seekers who are already logged onto the bulletin board may experience very slow service. Also, if a failure occurs with the computer, the entire bulletin board will become unavailable and thus, every job posting will become unavailable.

Additionally, bulletin boards are typically set up so that a job seeker submits a resume directly to the bulletin board provider. The resume is stored in a central repository along with all of the other resumes, and must be forwarded to the company to which the job seeker is applying for employment. This type of arrangement decreases the confidentiality of the resumes, because they are handled by the bulletin board provider instead of only by personnel at the company. Also, this type of arrangement decreases the company's confidentiality, since a complete job description is sent to the bulletin board provider. Furthermore, once the resumes are received by the company, they still must be manually organized and screened. In addition, if a company updates its listing of job descriptions, the updated list must be sent to every bulletin board to which the company subscribes.

It is further noted that the direct advertising methods discussed above require that a job seeker monitor the advertisements on a regular basis in order to ascertain whether a specific position is available. Hence, instead of relying on advertisements, an employer or job seeker may use a professional recruiter to find suitable candidates for available positions and vice-versa. However, the efforts of professional recruiters are limited by the resources available to them.

For example, if a recruiter has been hired by an employer to find suitable candidates for an available position, the recruiter must undertake efforts such as "cold calling" suitable candidates employed by other companies, networking with other recruiters to obtain names of potential candidates, and the like. Conversely, if a recruiter has been hired by a job seeker to find a suitable position, the recruiter may need to undertake similar efforts to locate such a position. Hence, it is likely that a recruiter will overlook available positions and suitable candidates. Furthermore, since recruiters charge a substantial fee for their services, many companies and job seekers are reluctant to use a recruiter and incur such expense.

In order to assist companies in facilitating their recruiting efforts, several software companies have developed resume screening programs which can be configured to screen a collection of resumes for the most qualified candidates. Resumes that are received by an employer who uses this software are first scanned into a computer and stored. The computer running the resume screening software can then be controlled to search those resumes for various attributes, such as college degrees, prior experience, special qualifications, and the like. The computer will then provide a list of the most qualified candidates out of the entire collection of resumes. This computerized screening and sorting method allows human resource personnel to devote more time to other tasks.

However, known resume screening software does not assist employers in advertising available positions. Although the resume screening software is useful once a resume has been received by the company, it provides no advantage in enabling the company to seek out the most qualified candidates. A company must still use either the conventional methods of advertising (e.g., newspaper, magazines, professional recruiter, etc.) or a career bulletin board in order to solicit resumes. Hence, the drawbacks associated with those types of advertising methods have not been resolved.

Therefore, a continuing need exists for a system which will maximize the scope of a company's advertising efforts while also providing a reasonably secure and efficient manner of forwarding resumes to the company and enabling the company to efficiently screen and categorize the resumes received. Additionally, a continuing need exists to assist a job seeker in locating available positions quickly and effectively.

SUMMARY OF THE INVENTION

An object of the present invention is to provide a method and apparatus which enables an employer to advertise available positions on a computer network, such as the Internet, to directly receive resumes from prospective candidates, and to efficiently organize and to screen the received resumes.

A further object of the present invention is to provide a method and apparatus which monitors employment advertisements for a job seeker and automatically notifies the job seeker when a position for which the job seeker is suitable becomes available.

A further object of the present invention is to provide a method and apparatus which enables a plurality of companies to advertise job positions at a single location accessible via a computer network, such as the Internet, enables a job seeker to access those positions via the computer network, and then disconnects a job seeker from the single location while enabling the job seeker to communicate directly with a company via the computer network when the job seeker selects an available position at that company.

The above objects are substantially achieved by providing a software program, recorded on a computer readable medium, for controlling a computer of a potential employer to generate a listing of available employment positions that can be accessed via the Internet. Specifically, the software program is adaptable to be run by an employer's computer to control the computer to generate a computer readable file (position file) that includes information pertaining to available employment positions and which can be accessed from a remote site via the Internet. For example, the position file can be posted as a Web site on the World Wide Web. A job seeker can access the Web site and search the information in the position file for a desired position.

Also, a portion of the position file can be uploaded to a remote site computer to link the position file to a computer readable file, such as a remote Web site, that is hosted by the remote computer. Job seekers can access the remote Web site and search the uploaded portion of the position file for a desired position. The remote computer also is capable of automatically searching the uploaded portion of the position file for data that matches data provided by the job seeker, and is capable of informing the job seeker's computer by an electronic message sent via the Internet when a match is found.

Furthermore, the portion of the position file which includes more detailed information about the available positions is maintained by the employer's computer instead of by the remote site. Hence, when a job seeker chooses to explore this additional information, the job seeker's computer is disconnected from the remote site, and reconnected to a new site which possesses this additional information that has been provided to that site by the computer of the employer offering the position. The position file further includes linking data which enables the job seeker's computer to send an electronic message, such as an e-mail or the like, to the employer's computer and vice-versa via a computer network such as the Internet.

BRIEF DESCRIPTION OF THE DRAWINGS

FIG. 12 is an example of a display screen generated by the computer performing the user information entry operations set forth in FIG. 11;

FIG. 18 is an example of a display screen generated by the computer when performing the sequence of steps shown in FIG. 17;

FIG. 25 is a flowchart illustrating an example of a sequence of steps performed by a computer when performing the personal search agent operation shown in FIG. 20;

FIG. 32 is an example of a display screen generated by a computer performing a resume scoring operation according to a step in the flowchart shown in FIG. 29;

FIG. 33 is an example of a display screen generated by a computer performing an operation for e-mailing a resume as discussed with regard to the flowchart set forth in FIG. 29;

FIG. 36 is an example of a display screen generated by a computer performing an operation for finding a resume as discussed with regard to the flowchart set forth in FIG. 29;

DETAILED DESCRIPTION OF THE PREFERRED EMBODIMENTS

Figure 1:
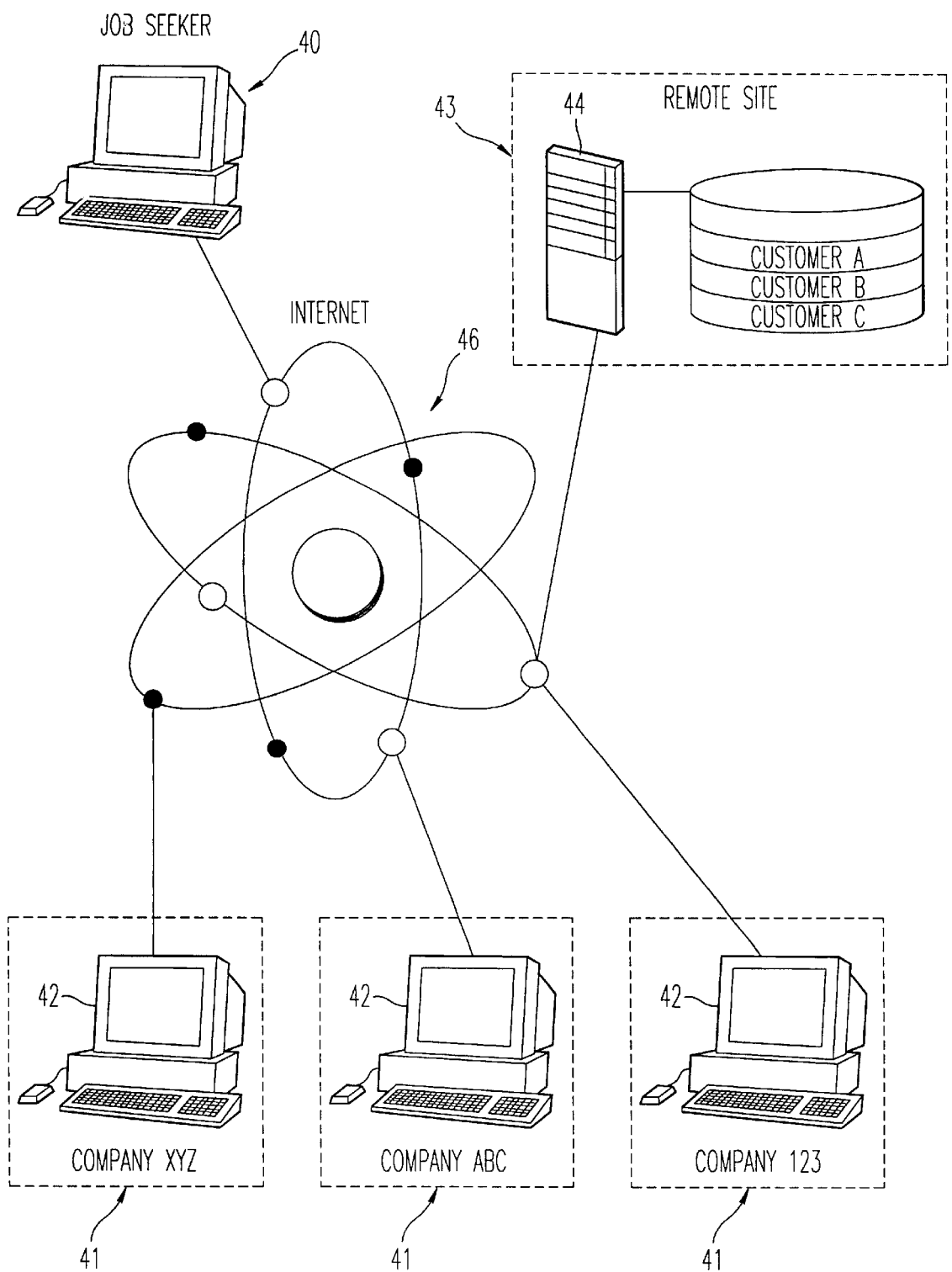
FIG. 1 is a diagrammatic illustration of a computerized job search system according to an embodiment of the present invention.

An overview of an embodiment of the present invention is illustrated in FIG. 1. Specifically, this figure illustrates a relationship between a computer 40 used by a person searching for a position (job seeker computer 40), a plurality of employers or companies 41 each having a computer 42 (company computer 42) which runs computer readable software according to an embodiment of the present invention, and a remote location 43 having a computer 44 (remote site computer 44) which runs additional computer readable software according to the present invention. The remote location computer 44 is maintained by a service provider which typically has contractual relationships with the employers or companies 41. The job seeker computer 40, company computers 42, and remote site computer 44 are provided with suitable modems and communications software so that they can communicate with each other via the Internet 46.

The operations performed by a company computer 42 running computer software according to an embodiment of the present invention will now be described. The computer readable software is written in the form of a computer executable program (hereinafter "the company site program" or "company site software"), typically in the form of a magnetic diskette, and is written, for example, in scripting languages such as C, Visual C++, HTML, JAVA, SQL, and the like.

Specifically, the company site program that is run by the company computer 42 is compatible for use with Windows NT™ or Windows 95™, but can be written in any language that is executable by any type of computer, and can be configured to be compatible for use with any type of operating system, software or Web browser. The company site program can be stored on any computer readable medium, such as a CD, floppy disk, or the like, and can be transmitted from one computer to another by e-mail or in any other known manner.

Figure 2:
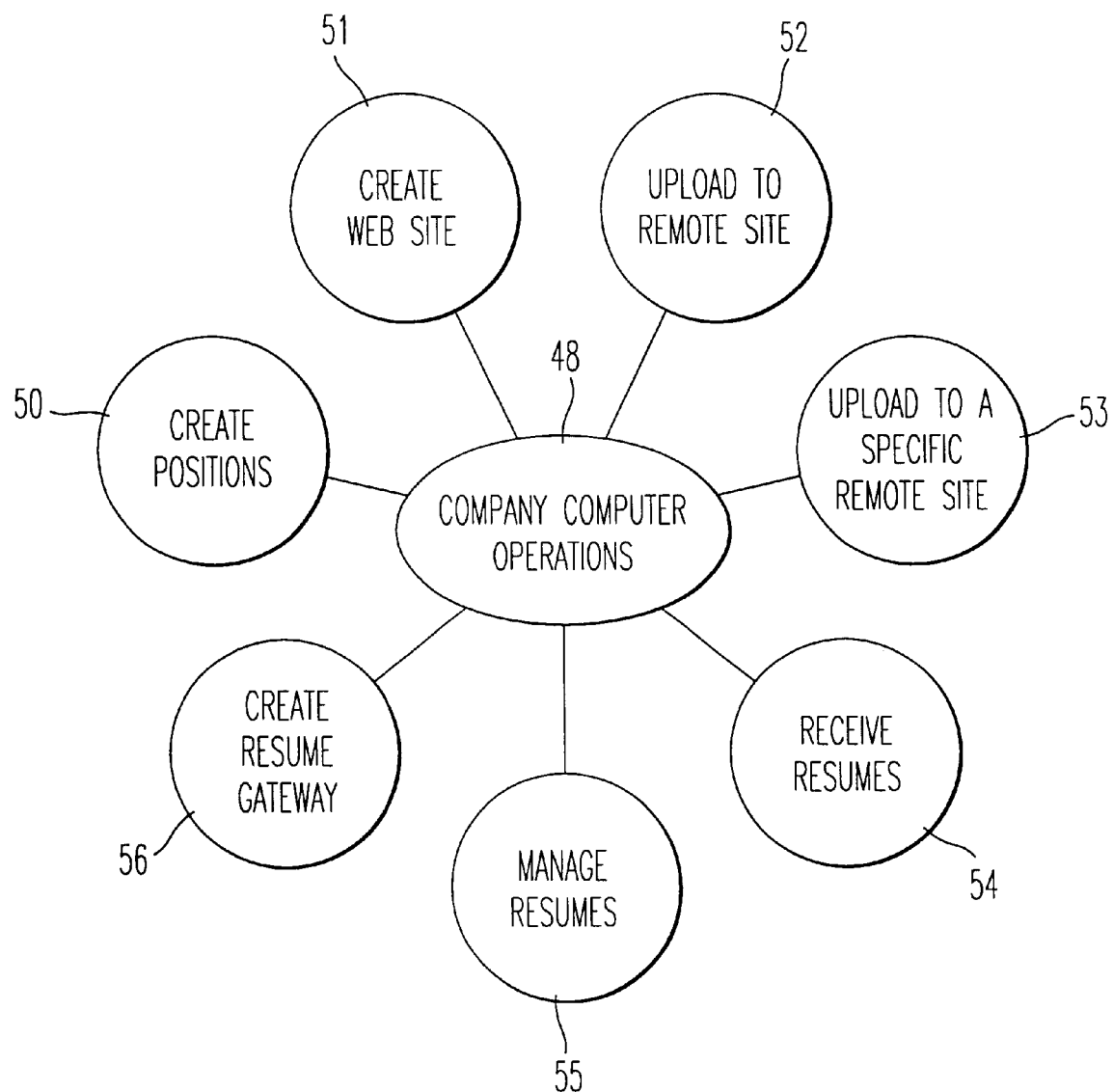
FIG. 2 is a state diagram illustrating an example of operations performed by a computer running a software program according to an embodiment of the invention.

FIG. 2 is a state diagram illustrating examples of the tasks that the company site program controls each of the company computers 42 to perform. That is, the overall operation 48 of the company computer 42 as controlled by the company site program includes a position posting operation 50, a Web site creation operation 51, uploading operations 52 and 53, resume handling operations 54 and 55, and a gateway creation operation 56, all of which are described in detail below. The position posting operation 50 will now be described with reference to FIGS. 3–10.

Figure 3:
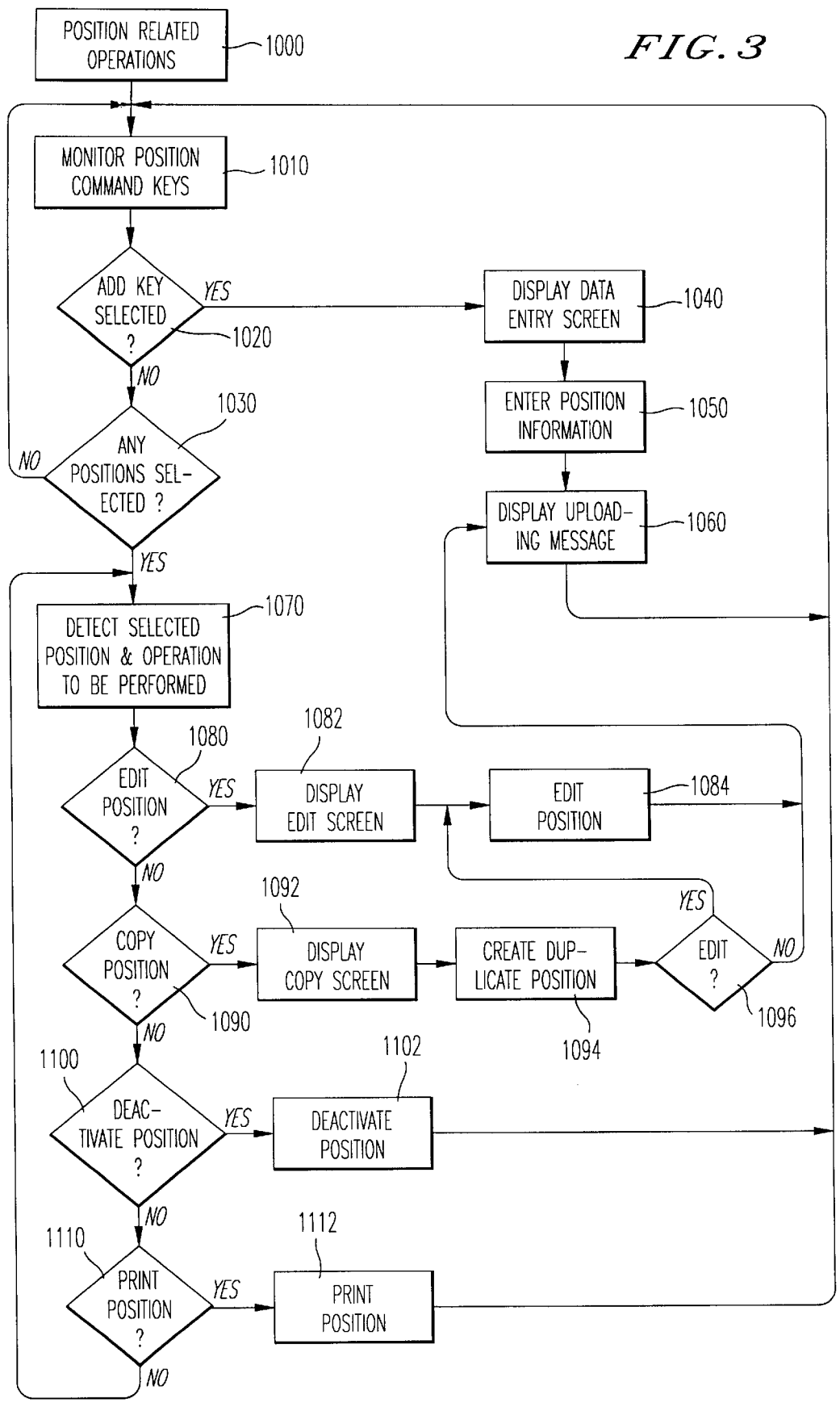
FIG. 3 is a flowchart illustrating an example of a sequence of steps performed by a computer performing the create positions operation shown in FIG. 2.

FIG. 3 is a flowchart illustrating an example of the operations performed by a company computer 42 when the computer 42 is controlled by the company site program according to an embodiment of the present invention to create a new job posting for an available position, or to manage an existing position. Specifically, the program controls the company computer 42 to display an interactive screen on its display screen which can be used by a person, such as one of the company's human resource personnel (e.g., a "hiring contact" for a specific position), to control the computer to perform certain operations which are described below.

The company site program can be configured to control the company computer 42 to allow a user (hereinafter "hiring contact") to interact with the program in any suitable manner. For example, if the company site program is being used with Windows 95™, the Windows 95™ display screen that is displayed on screen of the company computer 42 can be configured to display an icon which, when selected by the hiring contact (e.g., via manipulation of a computer mouse or in any known manner), will enable the hiring contact to interact with the program. Alternatively, if the program is being used with Windows NT™, the hiring contact can also select the icon representative of the program.

Once the icon is selected, the company site program will control the company computer 42 to display on its display screen a command requesting that the hiring contact enter his or her name, pseudonym, or the like, which allows the hiring contact to interact with or "log on" to the company site program. After the hiring contact has logged on, the company site program can control the computer 42 to display an interactive screen as illustrated, for example, in FIG. 4. It is noted that the screen shown in FIG. 4, as well as all of the exemplary screen configurations illustrated in the attached figures, may be found in the "TeamBuild™ Getting Started Guide" (Netstart™, Inc., 1996), the entire contents of which is incorporated by reference herein.

Figure 4:
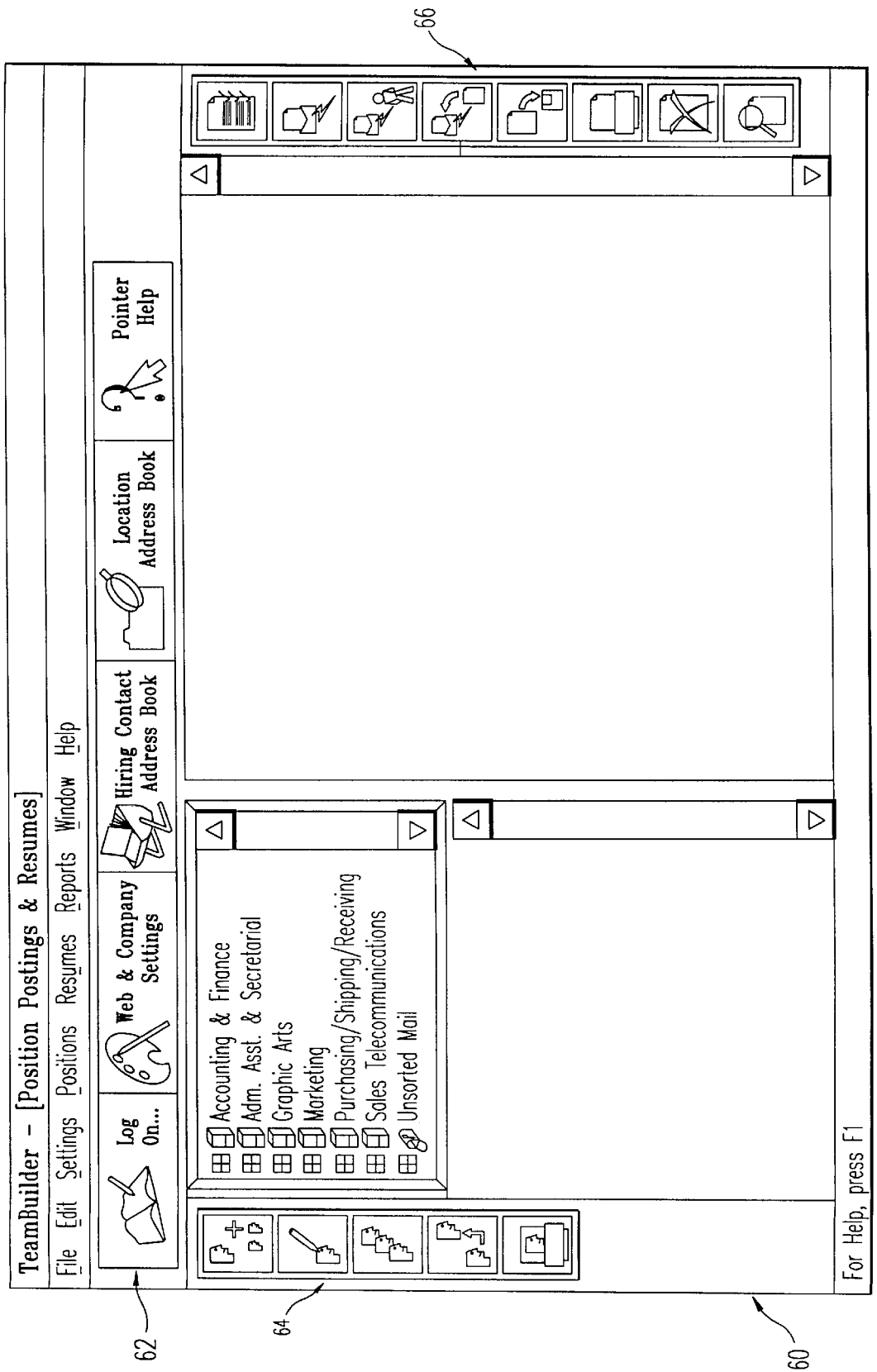
FIG. 4 is an example of a display screen generated by the computer performing the sequence of steps set forth in FIG. 3.

As stated, the interactive screen allows the hiring contact to instruct the company site program to control the company computer 42 to perform desired tasks. Specifically, as shown in FIG. 4, the display screen 60 includes an administrative tool bar display 62, a position tool bar display 64 and a resume tool bar display 66. The positions at which these tool bar displays appear on the screen can be changed by the hiring contact through the manipulation of a computer mouse, for example, or by any other method similar to that in which icons and display boxes in Windows 95™ or Windows NT™ are manipulated as would be appreciated by one skilled in the art.

Figure 5:
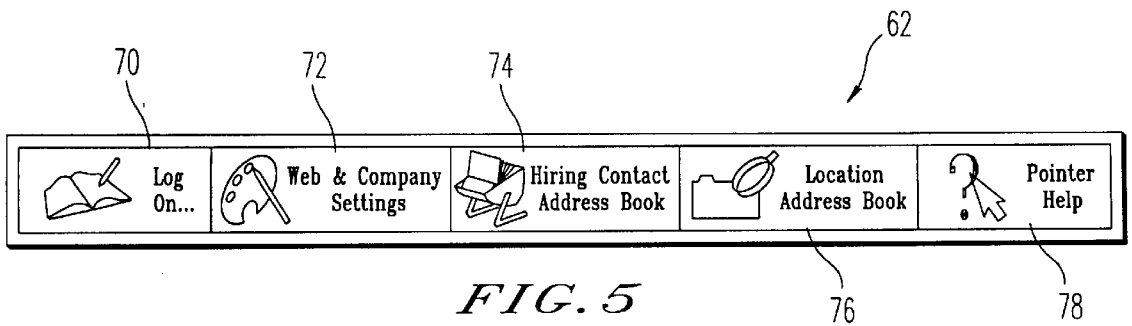
FIG. 5 is a detailed view of a portion of the display screen shown in FIG. 4.

As illustrated in FIGS. 4 and 5, the administrative tool bar 62 has a log-on command key 70, a web settings command key 72, a hiring contact address book command key 74, a location address book key 76, and a help command key 78, all of which are described in more detail below. These "keys" are software generated keys which can be selected, for example, by manipulation of a mouse as would be readily appreciated by one skilled in the art. It is noted that the use of the term "selected" or its derivatives in this application refers to selection by manipulation of a mouse, depression of the "enter" key on a computer keyboard, or in any manner as would readily be appreciated by one skilled in the art.

Figure 6:
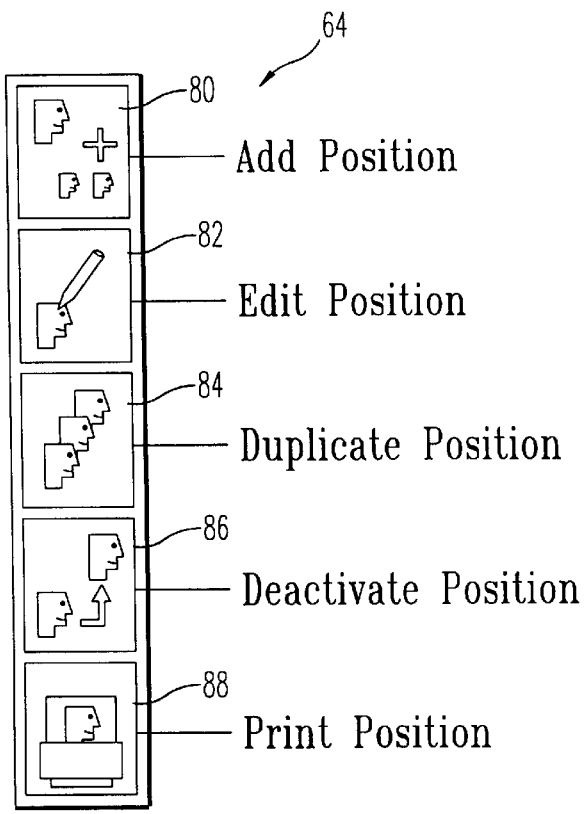
FIG. 6 is a detailed view of another portion of the display screen shown in FIG. 4.
Figure 7:
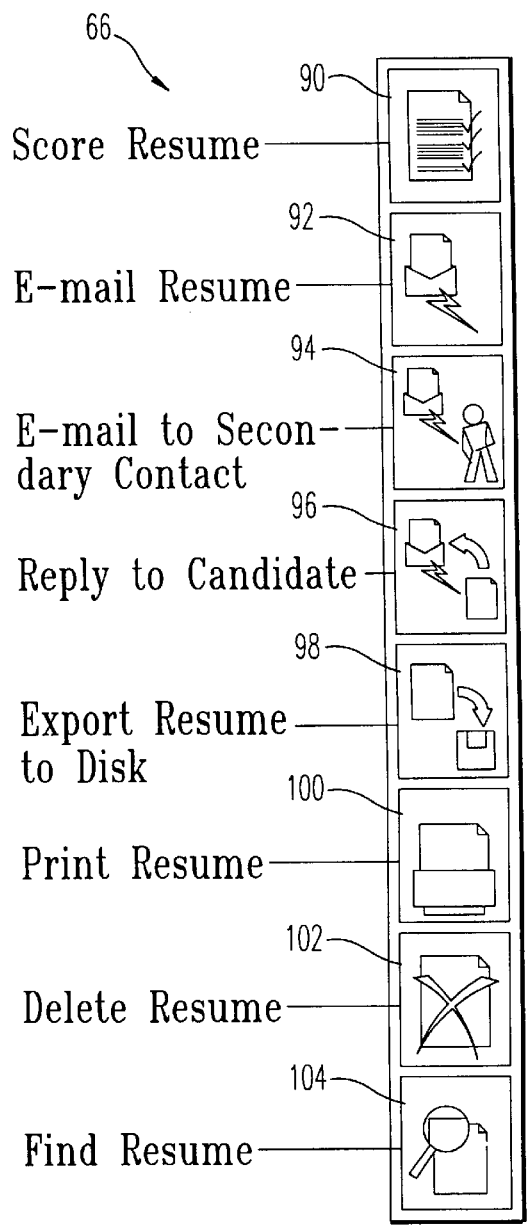
FIG. 7 is a detailed view of a further portion of the display screen shown in FIG. 4.

As shown in FIGS. 4 and 6, the position tool bar 64 has an add position command key 80, an edit position command key 82, a duplicate command key 84, a deactivate position command key 86, and a print command position command key 88, all of which are software keys as described in detail below. As shown in FIGS. 4 and 7, the resume tool bar 66 includes a score resume command key 90, an e-mail resume command key 92, an e-mail to secondary contact command key 94, a reply to candidate command key 96, an export resume to disk command key 98, a print resume command key 100, a delete resume command key 102, and a find resume command key 104, all of which are software generated keys and described in detail below.

Turning back to FIG. 3, an example of the interactive process that occurs between the company site program and a hiring contact will now be discussed. It is noted that the company site program can control the company computer 42 to perform other tasks and operations contemporaneously with the operations discussed with respect to FIG. 3 and, for that matter, any of the operations discussed herein.

It is further noted that before the company site program controls the company computer 42 to permit a user to perform certain tasks, such as adding a job description, faxing a resume, and so on, the company site program will check the status of the license key governing the particular tasks or feature to be performed or used. As would be appreciated by one skilled in the art, the license keys are provided by the organization which provides the company site program to the company, and are set based on the agreement between the provider organization and the company using the company site program. For example, if the company has not licensed the resume faxing feature from the provider, the provider will not have activated the license key governing that feature which would instruct the program to allow a hiring contact at the company to use that feature. Also, if the company has only paid the provider to use the company site program to post a certain number of job openings, the license key governing the amount of job postings will control the program to prevent the hiring contact from posting a number of jobs in excess of that amount.

When the company site program is controlling the company computer 42 to perform the position related operations beginning at step 1000, the company site program in step 1010 will cause the company computer 42 to monitor the position command keys of the position tool bar 64. In step

1020, if the company site program determines that the add position command key 80 has not been selected, the company site program will continue to step 1030 where it will monitor whether any of the position categories have been selected. It is noted that in the upper left hand portion of the display screen 60, as shown in FIG. 4, the listing of position categories will be displayed next to a respective "plus" (+) sign. A hiring contact can select any of those position categories by selecting the "plus" sign next to that category by manipulation of a mouse, for example, or in any manner that would be readily appreciated by one skilled in the art. It is further noted that the position categories can be displayed at any suitable location on the display screen of the company computer 42, and can be displayed in any suitable fashion.

If the company site program determines in step 1030 that none of the position categories have been selected, then the company site program will return to step 1010 where it will monitor the position tool bar 64 and categories. However, if the company site program determines in step 1030 that a position category has been selected, the company site program will proceed to step 1070 as will be described below. Of course, steps 1020 and 1030, and any of the steps discussed herein, can be performed in any suitable order as would be appreciated by one skilled in the art.

Figure 8:
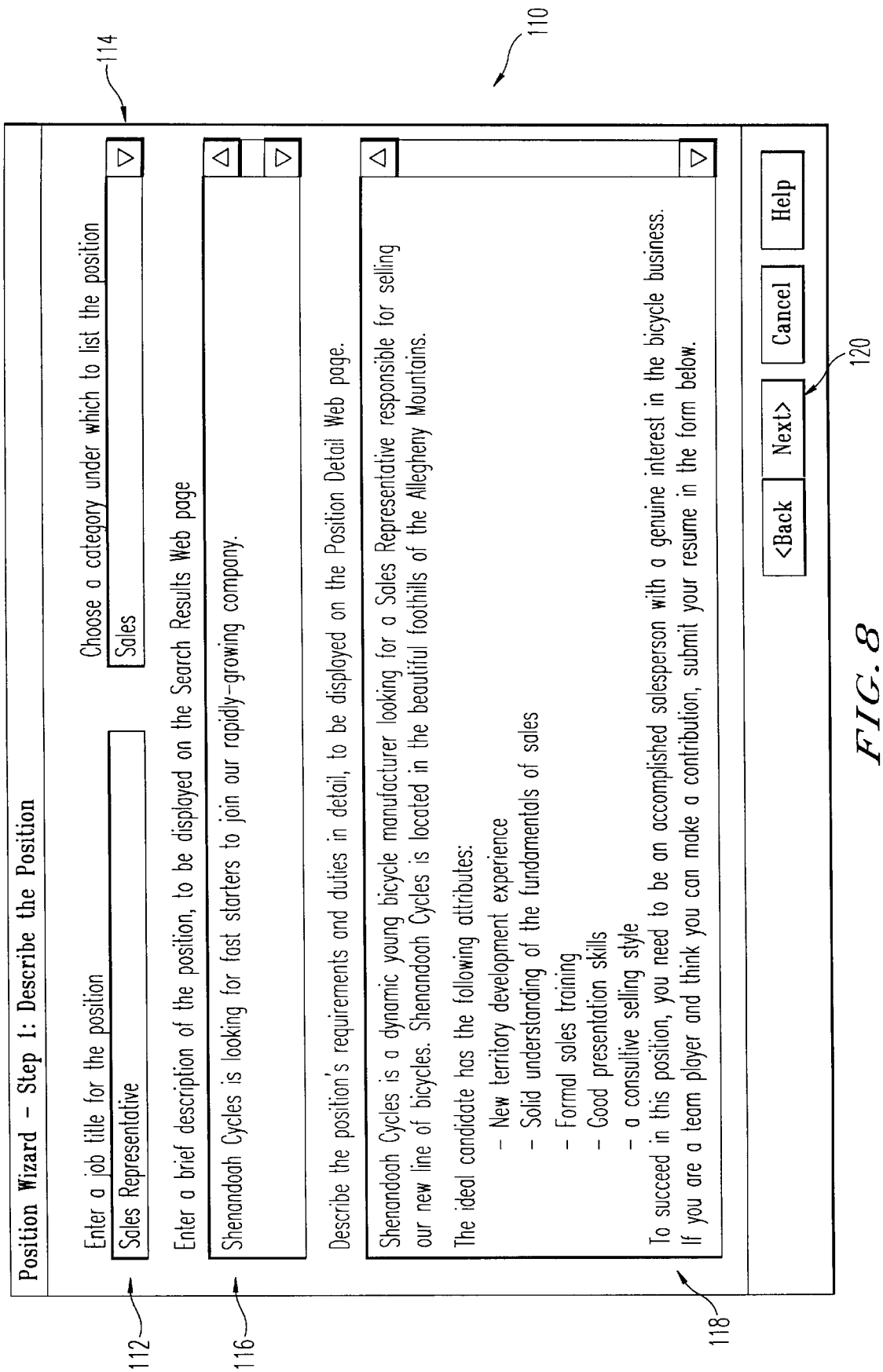
FIG. 8 is an example of a display screen generated by the computer performing the position creating or position editing steps of the sequence of steps set forth in FIG. 3.

If the company site program has determined in step 1020 that the add position command key 80 has been selected, the company site program will proceed to step 1040 where it will control the computer 42 to display on its display screen a screen 110 as shown in FIG. 8. Specifically, the company site program will control the computer 42 to display on its display screen a plurality of commands instructing the hiring contact to enter information pertaining to the position for which an applicant is being sought.

For example, as illustrated, the screen display 110 may include a position entry location 112 in which the hiring contact can enter the title of the position, a category location 114 in which the hiring contact can enter the category of the position, a brief description location 116 in which the hiring contact can enter a brief description of the position, and a detailed description location 118 in which the hiring contact can enter a detailed description of the position.

As the hiring contact enters the information in step 1050, the computer 42 will store that information at a location in memory pertaining to that position which can be accessed with reference to that position. That information can also be stored with respect to the particular hiring contact.

When the hiring contact enters all of the information on screen 110, the hiring contact can select the next screen command 120 to cause the company site program to control the computer to display another screen having commands and locations in which the hiring contact can enter further information and criteria pertaining to the position, such as salary requirements, education requirements, percentage of travel required, whether the position is part time or full time, required hours per week, the dates during which the position is open, whether the position is a high priority, medium priority, or low priority position, and any additional information which the hiring contact believes may be pertinent in describing the position to a prospective candidate. The company site program also enables the hiring contact to perform a spell check on the entered information, if desired.

If the hiring contact then selects a command indicating that the data entry has been completed, the company site program will control the computer 42 in step 1060 to display on its display screen a message indicating, for example, that the information has been received and stored, and further indicating that the position will be "posted" in the manner described in detail below. The company site program can then return to controlling the computer to display on its display screen, for example, display screen 60 as shown in FIG. 4.

If the company site program has determined in step 1020 that the add position command key 80 has not been selected, and has determined in step 1030 that a position category has been selected, the company site program in step 1070 will control the computer 42 to continue to display on its display screen a display screen 60 as shown, for example, in FIG. 4. The program will then interpret the selection of a position category as a request by the hiring contact to manipulate (e.g., edit, copy, discontinue, and so on.) a position stored with respect to that position category.

For example, if the hiring contact wishes to take action on a "sales representative" position, the hiring contact selects the symbol (i.e., the "plus" sign) next to the category "sales" by manipulation of a mouse or in any manner known in the art. The company site program will then control the computer to display, on its display screen, a screen 130 as shown, for example, in FIG. 9, in which the different types of sales positions (e.g., sales representative, sales manager—West Coast, and so on.) that have been previously added in the manner discussed above with regard to steps 1020 through 1060 are displayed in a list 132. Of course, the different types of sales positions can be displayed in any particular order or fashion.

The hiring contact can then select the particular position that is to be acted upon (e.g., "sales representative"). The hiring contact can then select a particular command key (e.g., edit position command key 82 from the position tool bar 64), and the selection will be identified by the program in steps 1080 through 1120.

For example, if the company site program determines in step 1080 that the hiring contact has selected the edit position command key 82 and thus wishes to edit the selected position (e.g., the "sales representative" position) that has been selected in steps 1030 and 1070 in the manner described above, the program in step 1082 will control the computer 42 to display on its display screen a screen as shown, for example, in FIG. 8. The hiring contact can then edit the information in step 1084 in the position in a manner similar to that described above in which the hiring contact enters information pertaining to the position. When the hiring contact indicates that the editing has been completed, the company site program will control the computer 42 to display on its display screen a message indicating that the information has been received and stored, and further indicating that the position will be "posted" in the manner described in detail below. In this regard, it is noted that the updated information will automatically be uploaded or reposted to all designated locations. Hence, a hiring contact need not update the positions at each site individually.

Figure 10:
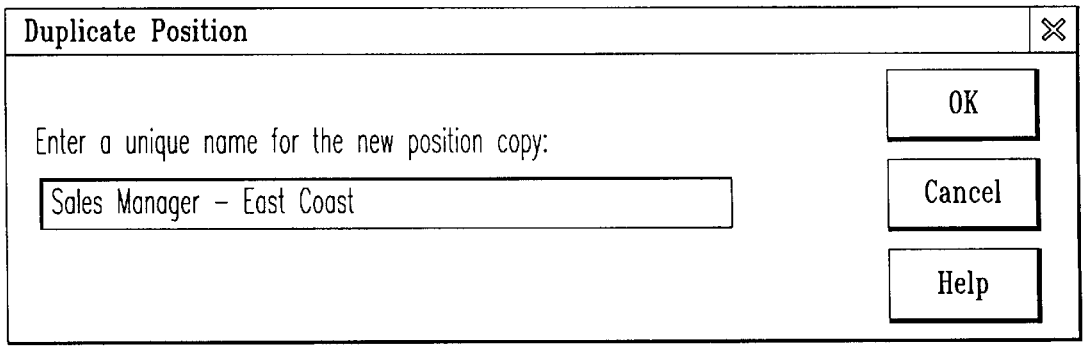
FIG. 10 is an example of a screen display generated by a computer performing the position duplicating steps set forth in FIG. 3.

If the company site program determines in step 1090 that the hiring contact has selected the duplicate position key 84 and thus wishes to duplicate the existing position that has been selected in the manner described above with regard to steps 1030 and 1070, the company site program in step 1092 will control the computer 42 to display on its display screen a display 136 as shown, for example, in FIG. 10. The hiring contact can then enter the name of the new position which is to be the duplicate of the selected position, and thus create that duplicate new position in step 1094. The hiring contact in step 1096 can then select to edit the new position by selecting the edit position key 82 of the position tool bar 64 and editing the position information in the manner described above. After these steps have been performed, the company site program will control the computer 42 to display on its display screen a message indicating that the information has been received and stored, and further indicating that the position will be "posted" in the manner described in detail below.

If a position becomes filled or the company is no longer interested in hiring a person for that position, the position can be deactivated by the hiring contact. A deactivated position is stored for access by the company site program, but is not posted in the manner described in detail below. Of course, the company site program can be instructed to deactivate the position automatically based on information (e.g., the dates during which the position is to be active) entered by the hiring contact during the position adding step.

To deactivate a position manually, the hiring contact will select the position in the manner discussed above with regard to steps 1030 and 1070. Then, if the company site program determines in step 1100 that the hiring contact has selected the deactivate position key 86 from the position tool bar 64, the company site program will deactivate that selected position in step 1102. Alternatively, if the company site program determines in step 1100 that the hiring contact has selected a delete position command (not shown) from the positions menu command 134, the program will delete the position from the list of positions 132.

Additionally, if the hiring contact wishes to print a position, the hiring contact can select the position in the manner described above with regard to steps 1030 and 1070, and select the print position key 88 of the position tool bar 64. The company site program will recognize selection of this key in step 1110, and control the computer 42 in step 1112 to print the selected position at a printer (not shown).

As discussed above, the company site program typically will store the positions with respect to categories (e.g., sales, marketing), hiring contacts, and geographic locations. Accordingly, if a particular hiring contact is to be used as the contact person for certain positions, it may be necessary to add the name of that new hiring contact to the program.

Figure 11:
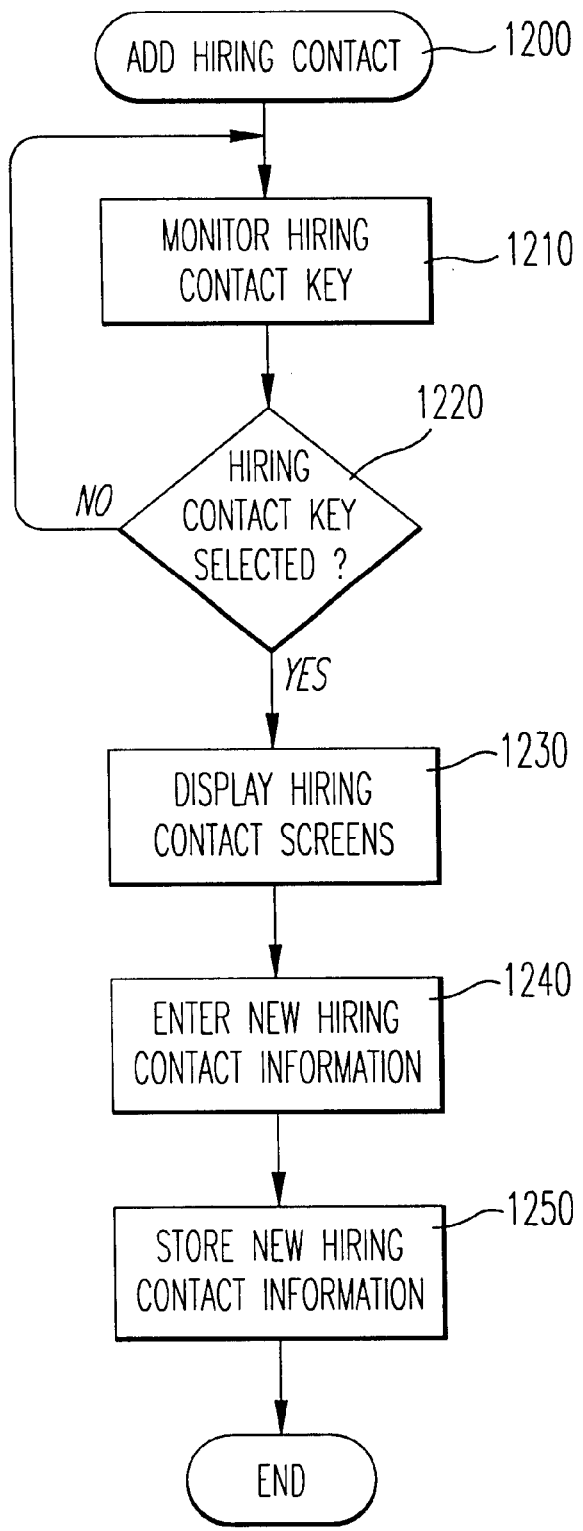
FIG. 11 is a flowchart illustrating an example of a sequence of steps performed by a computer running the program according to the embodiment of the present invention described with regard to FIGS. 1–10 when the computer is being controlled to add user information.
Figure 12:
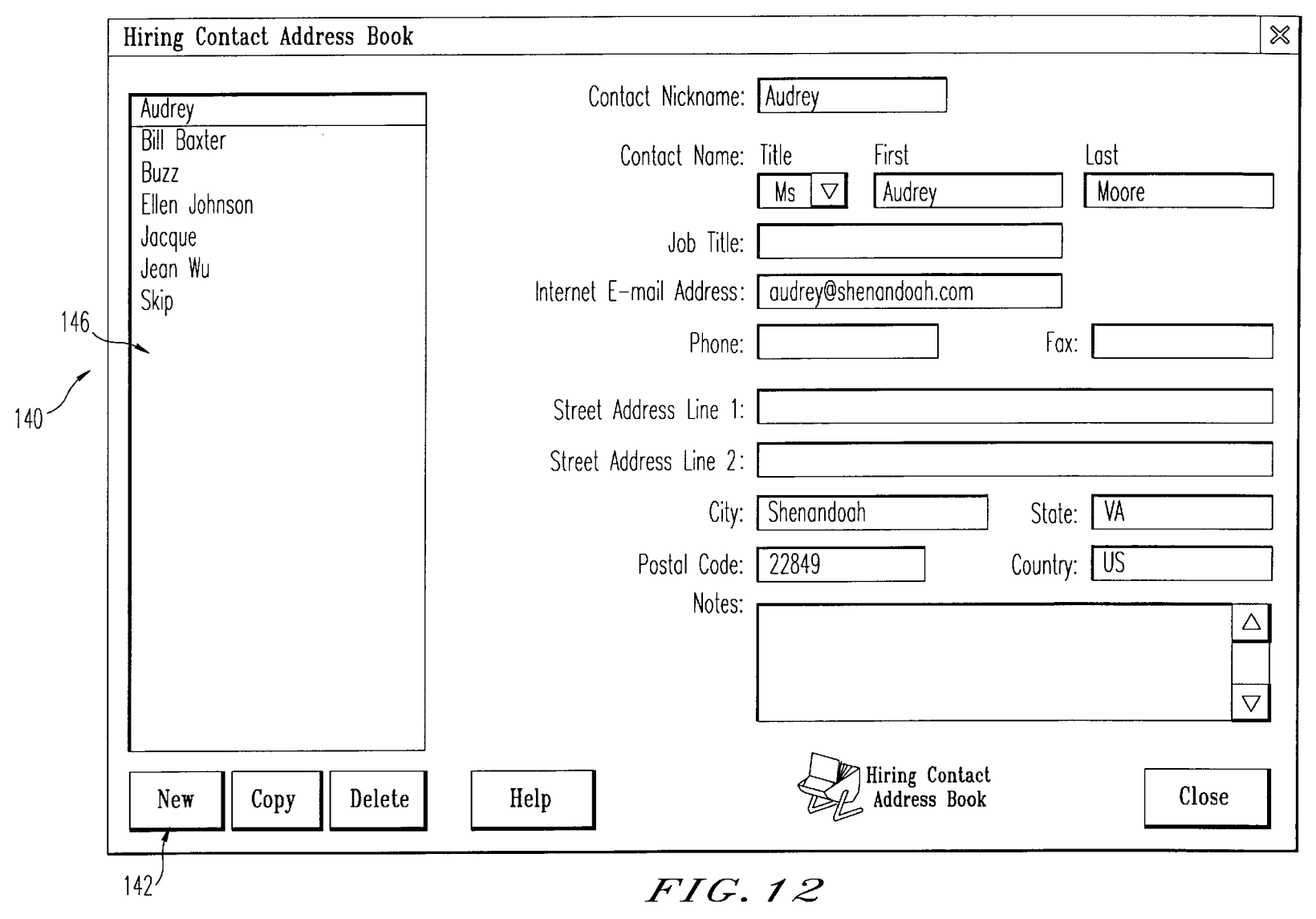

In the add hiring contact process shown in FIG. 11 beginning at step 1200, the company site program in step 1210 will monitor the hiring contact key 74 of the administrative tool bar display 62 as shown in FIGS. 4 and 5. If the company site program determines in step 1220 that the key 74 has not been selected, the monitoring will continue. However, if the company site program determines in step 1220 that the hiring contact key 74 has been selected, the company site program will control the computer 42 in step 1230 to display on its display screen a screen display 140 as shown, for example, in FIG. 12.

Figure 13:
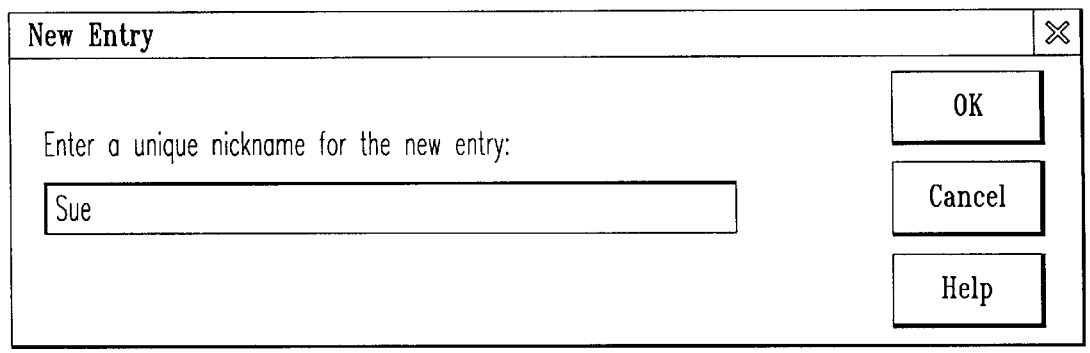
FIG. 13 is an example of a screen display generated by the computer performing the user information entry operations set forth in FIG. 11.

An existing hiring contact can then select a command key 142 (e.g., the "new" key) on the screen display 140, which causes the company site program to control the computer 42 to display on its display screen a new entry box 144 as shown, for example, in FIG. 13. In step 1240, the existing hiring contact can enter in the new entry box 144 and screen display 140 the new hiring contact information, such as the new hiring contact's name, e-mail address, postal address, and the like, which will be used by the program. The new name is then stored and displayed in step 1250 by the company site program in the list of names 146 shown on the screen display 140.

Figure 14:
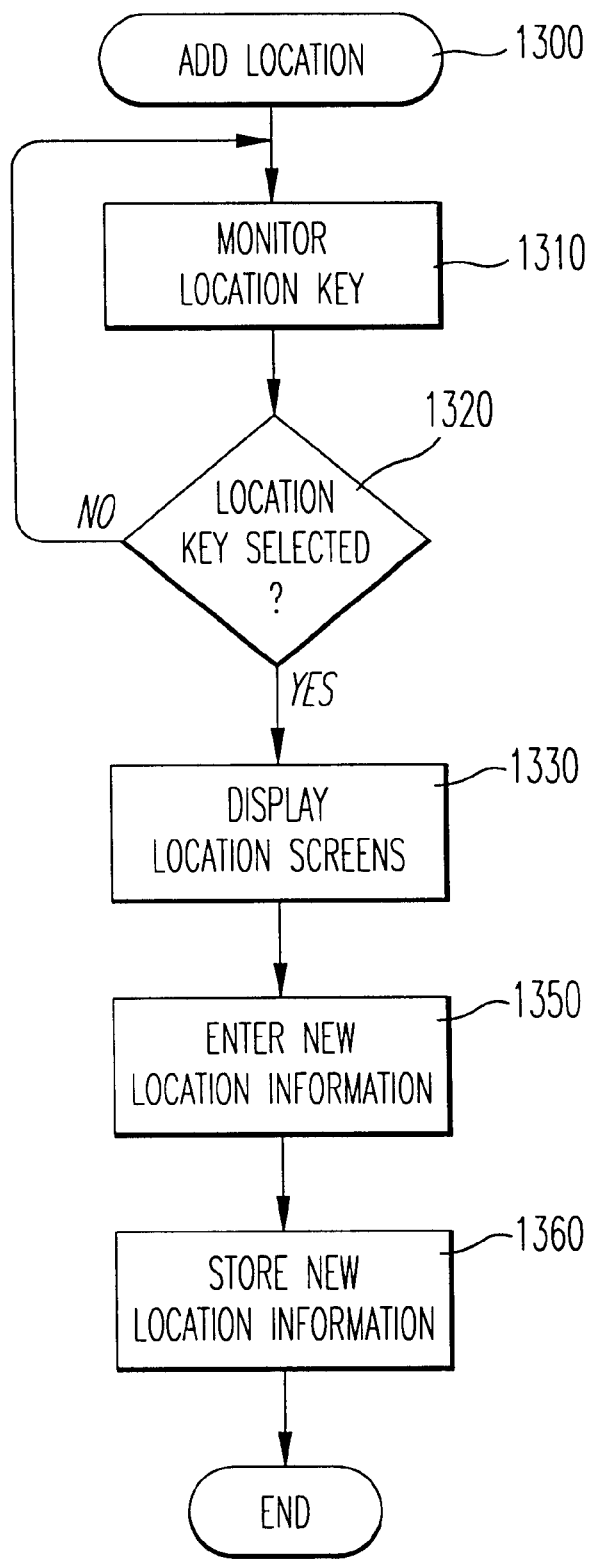
FIG. 14 is a flowchart showing an example of a sequence of steps performed by a computer running the program according to the embodiment of the present invention described with regard to FIGS. 1–13 when the computer is being controlled to enter information pertaining to geographic locations.

If a hiring contact wishes to add a location in the add location process shown in FIG. 14 beginning at step 1300, the company site program in step 1310 will monitor the location address book key 76 of the administrative tool bar display 62 as shown in FIGS. 4 and 5. If the company site program determines in step 1320 that the key 76 has not been selected, the monitoring will continue. However, if the company site program determines in step 1320 that the location address book key 76 has been selected, the program will control the computer 42 in step 1330 to display on its display screen a screen display 150 as shown, for example, in FIG. 15.

Figures 15, 16:
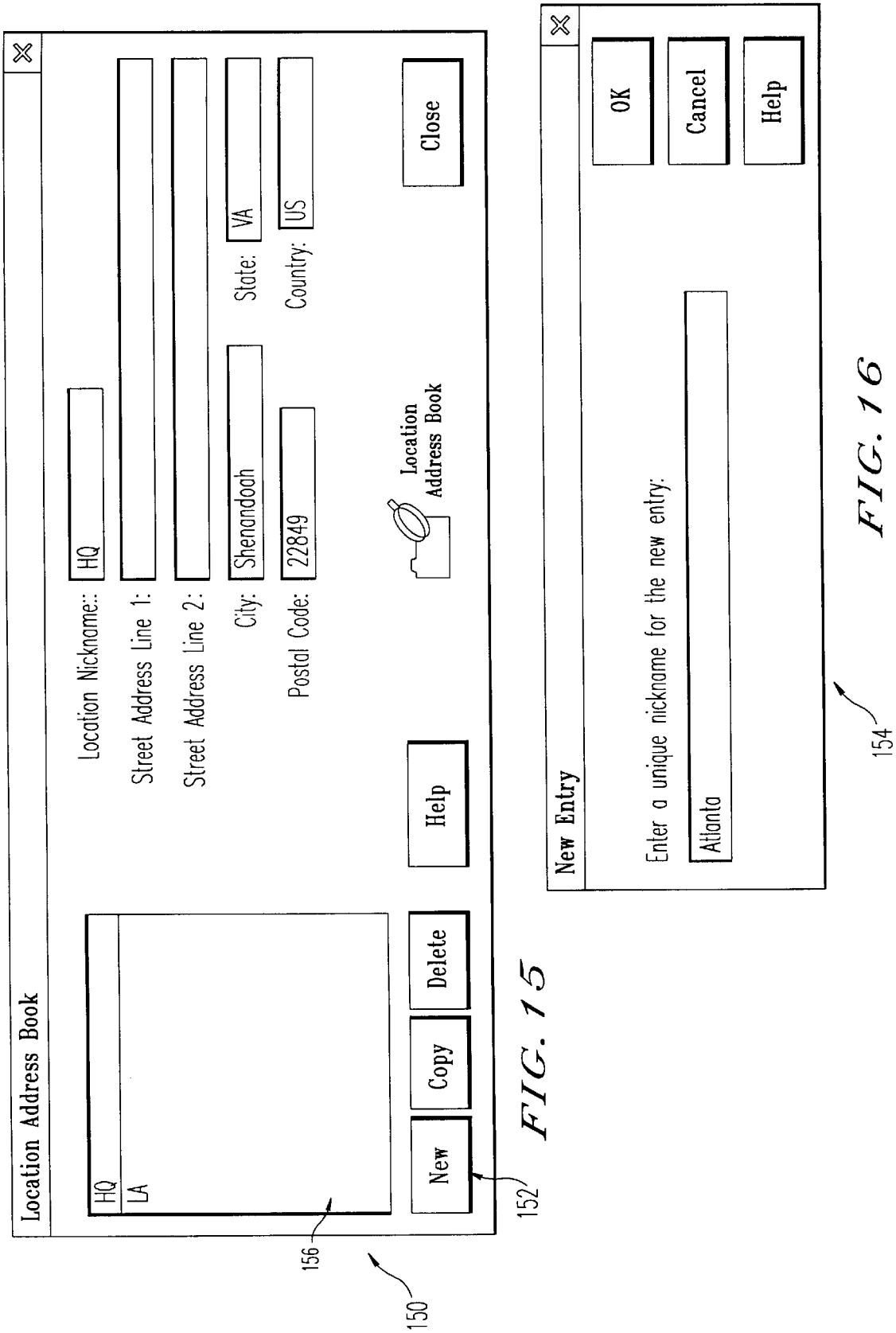
FIG. 15 is an example of a screen display generated by the computer when performing the operations shown in FIG. 14.
FIG. 16 is an example of a screen display generated by the computer when performing the operations shown in FIG. 14.

A hiring contact can then select a command key 152 (e.g., the "new" key) on the screen display 150, which causes the company site program to control the computer 42 to display on its display screen a new entry box 154 as shown, for example, in FIG. 16. In step 1340, the hiring contact can enter in the new entry box 154 and screen display 150 the new location contact information, such as the city, state, country, and the like, which will be used by the program. The new location name is then stored and displayed by the program in the list of names 156 shown on the screen display 150.

It is noted that if, at any time, a hiring contact wishes to receive help, the hiring contact can select the help command key 78 in the tool bar 62. In response to this selection, the company site program will control the computer to display various informational commands on its display screen.

In addition, by selecting the log-on command key 70 of the administrative tool bar 62, a hiring contact can log-on to the program again as himself or herself, or as another hiring contact. That is, in response to the selection of the log on command key 70, the company site program will control the computer 42 to display on its display screen instructions requesting the hiring contact to enter the name of the hiring contact logging on.

Figure 9:
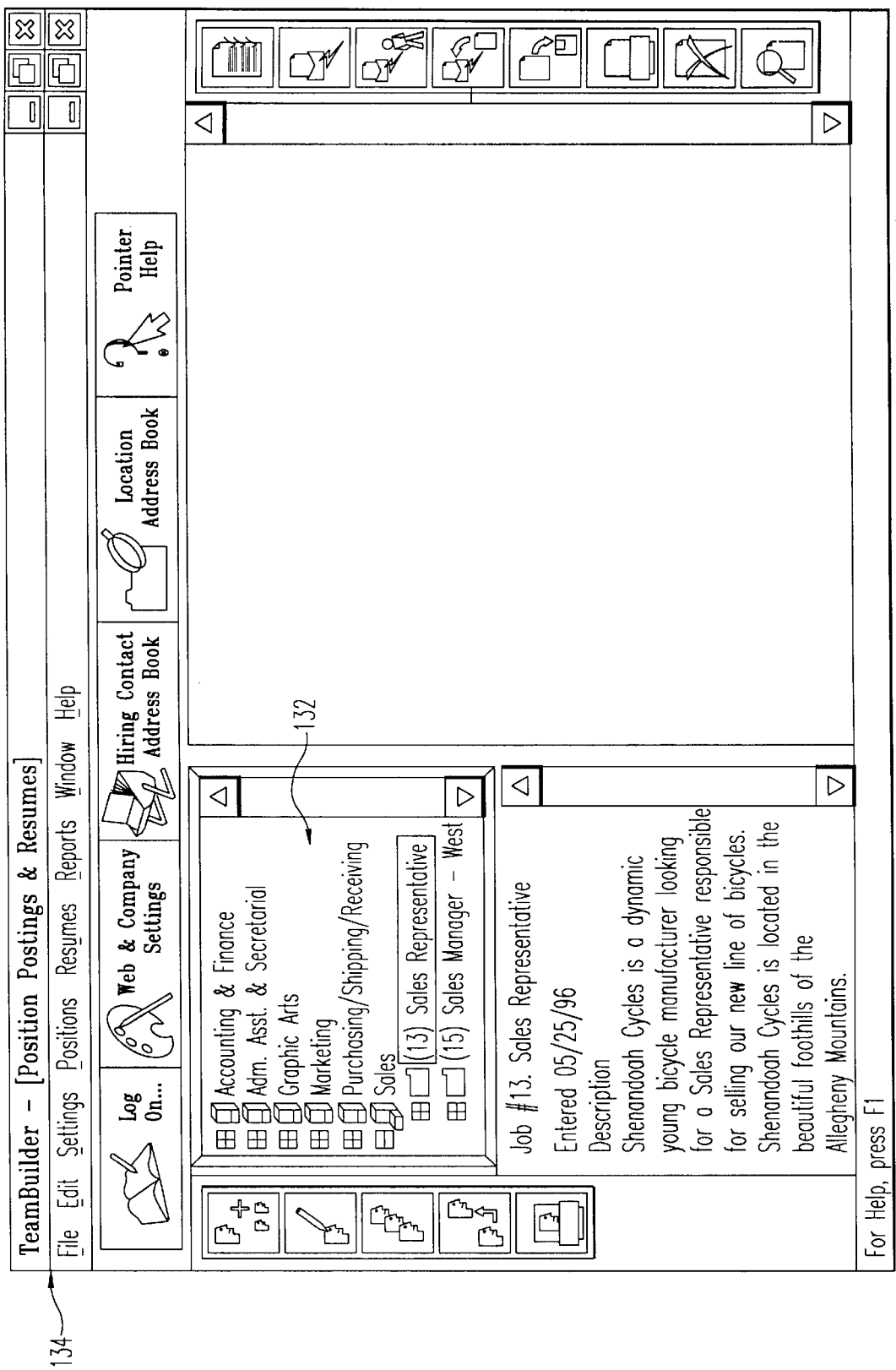
FIG. 9 is an example of a display screen generated by a computer performing the position editing, duplicating, deactivating or printing steps set forth in Fig.3.

It is noted, for example, that positions are typically stored with respect to a hiring contact responsible for that position. Hence, by logging onto the company site program as another hiring contact, the hiring contact can then access the other hiring contact's positions as would be displayed on a screen display (e.g., screen display 130 as shown in FIG. 9) for that other hiring contact. Also, by again logging on as himself or herself, a hiring contact can have access to resumes received for those positions as described in detail below.

As described briefly above, once a position has been added, or an existing position has been modified in the manner described above, the company site program will control the computer 42 to automatically upload the added or modified positions to all designated locations, as described in more detail below. Also, the company site program can be used to create a Web site for the company 41 on the World Wide Web on which the positions can be listed. A general description of the World Wide Web and Web Sites (web pages) is set forth in a book by S. Harris and G. Kidder entitled *Netscape™ Quick Tour for Macintosh* (Chapel Hill, N.C.: Ventana Press, Inc., 1995), the entire contents of which are incorporated by reference herein. The Web site can then be accessed by a job seeker's computer (e.g., by a Web browser being run on the job seeker's computer), and the job seeker can search the positions listed on the Web site for a particular desired position. The positions can also be uploaded to the remote site computer 44 as will be discussed in more detail below.

Figure 17:
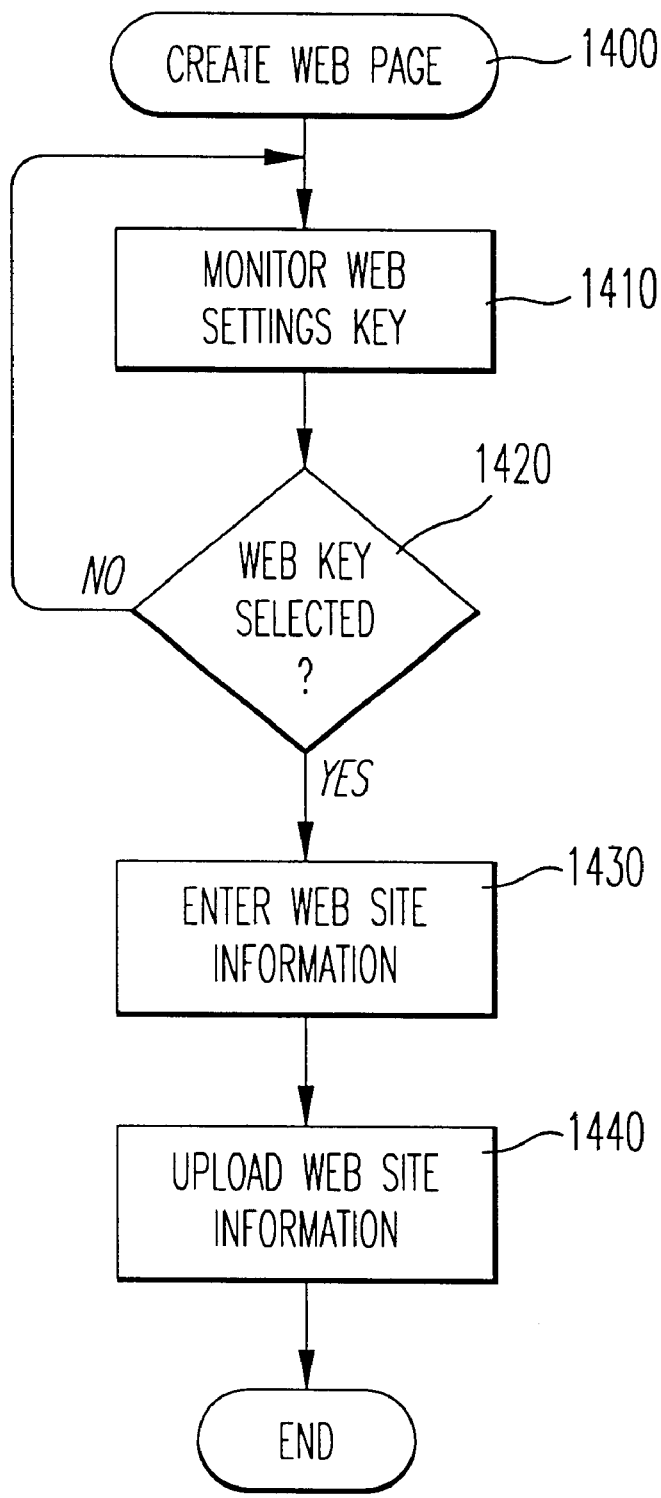
FIG. 17 is a flowchart illustrating an example of a sequence of steps performed by a computer when performing the create web site operation shown in FIG. 2.

Specifically, in the Web site creating process 51 (FIG. 2) beginning in step 1400 of the flowchart shown in FIG. 17, the program in step 1410 will control the computer 42 monitor the web and company settings command key 72 of the tool bar 62 for selection. If the company site program determines in step 1420 that the command key 72 has not been selected, the company site program will continue to monitor the command key. However, if the company site program determines in step 1420 that the command key has been selected, the company site program will control the company computer 42 in step 1430 to create a Web site for the company which will be accessible on the Web, and then in step 1440 will upload the computer readable file for the Web site via the Internet to the computer responsible for generating the Web site.

That is, the company site program will control the computer 32 to display on its display screen a screen 160 as shown in FIG. 18. The hiring contact can enter information pertaining to the company in the available spaces in response to the commands set forth on the display screen 160. The company site program automatically will control the computer 42 to set up the Web site based on the information pertaining to the position and, if desirable, the company in general, as entered by the hiring contact.

For instance, the hiring contact can select the format of the Web site, insert a company logo on the Web site, and provide information pertaining, for example, to the company's benefits plan on the Web site. The hiring contact can further enter an Internet e-mail address on the Web site so that e-mail messages can be sent to the hiring contact, for example, by a prospective applicant accessing the Web site. The Web site can be used as the company's only Web site, or can further be linked to the company's existing home page on the Web.

Typically, the Web site is configured to display the information pertaining to the positions in a brief format and a detailed format. That is, the Web site can include a "results" page, which is a listing of the available positions, and a "position detail" page which provides the more detailed information pertaining to the available positions.

Additionally, the Web site can be configured to include a "search" page. If the job seeker accesses this search page, the job seeker's computer 30 will display commands on its display screen instructing the job seeker to enter information, such as type of position, salary requirements, geographic location, and the like. The computer responsible for hosting the Web site will then search the list of positions to determine if a match exists between any one of those positions and the information entered by the job seeker. The host computer will control the Web site to display a listing of the matching positions on, for example, the results page described above. The prospective applicant can then access the position detail page to access the more detailed information pertaining to those listed positions.

As stated, the company site program can be used to create its own Web page which the company 41 will use to advertise positions that are available. Furthermore, the program can be instructed to upload a computer readable file including information pertaining to those positions to an remote site computer 44 that runs a program (hereinafter "the remote site program") which creates its own Web page that a job seeker can access via the job seeker's computer (e.g., through the use of a Web browser) and search for a particular position.

Figure 19:
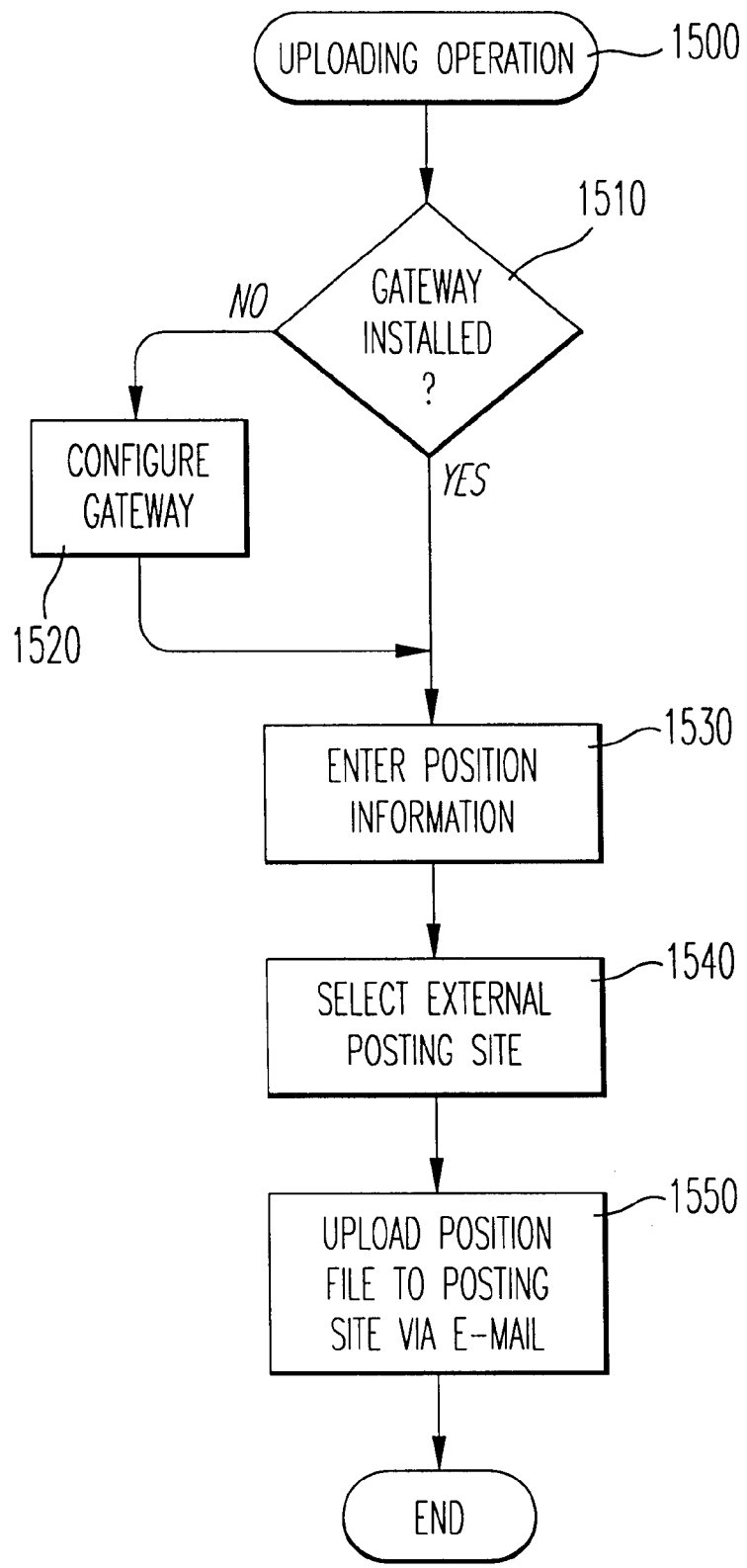
FIG. 19 is a flowchart illustrating an example of a sequence of steps performed by a computer when performing the upload to remote site operation shown in FIG. 2.

For example, when the company computer 42 is being controlled by the software to perform an uploading operation 52 (FIG. 2) beginning at step 1500 in FIG. 19, the computer 42 will determine in step 1510 whether an external gateway has been configured giving the company computer 42 access to the Internet. If no gateway has been configured, the program will control the company computer 42 to create a gateway in step 1520.

Once the computer 42 determines that a gateway has been created, a position to be posted can be created in step 1530 by a hiring contact in the manner described above with respect to FIG. 3. In step 1540, the hiring contact can then select (e.g., by name) the external site or sites to which a computer readable file including the position information is to be uploaded. The computer readable file is then uploaded to the external site or sites, such as MonsterBoard, CareerMosaic, or the like, in step 1550.

An external site, such as remote site computer 44, can also run a program for hosting a Web site on which the uploaded positions can be posted. For example, a service provider at the remote site 43 can maintain a job search program which enables job seekers to perform an employment search at many companies simultaneously. As indicated in operation 52 illustrated in FIG. 2, the company site program run by the company computer 42 can be instructed to control the company computer 42 to upload a computer readable file including the position information to the remote site computer 44 running the remote site program.

Figure 20:
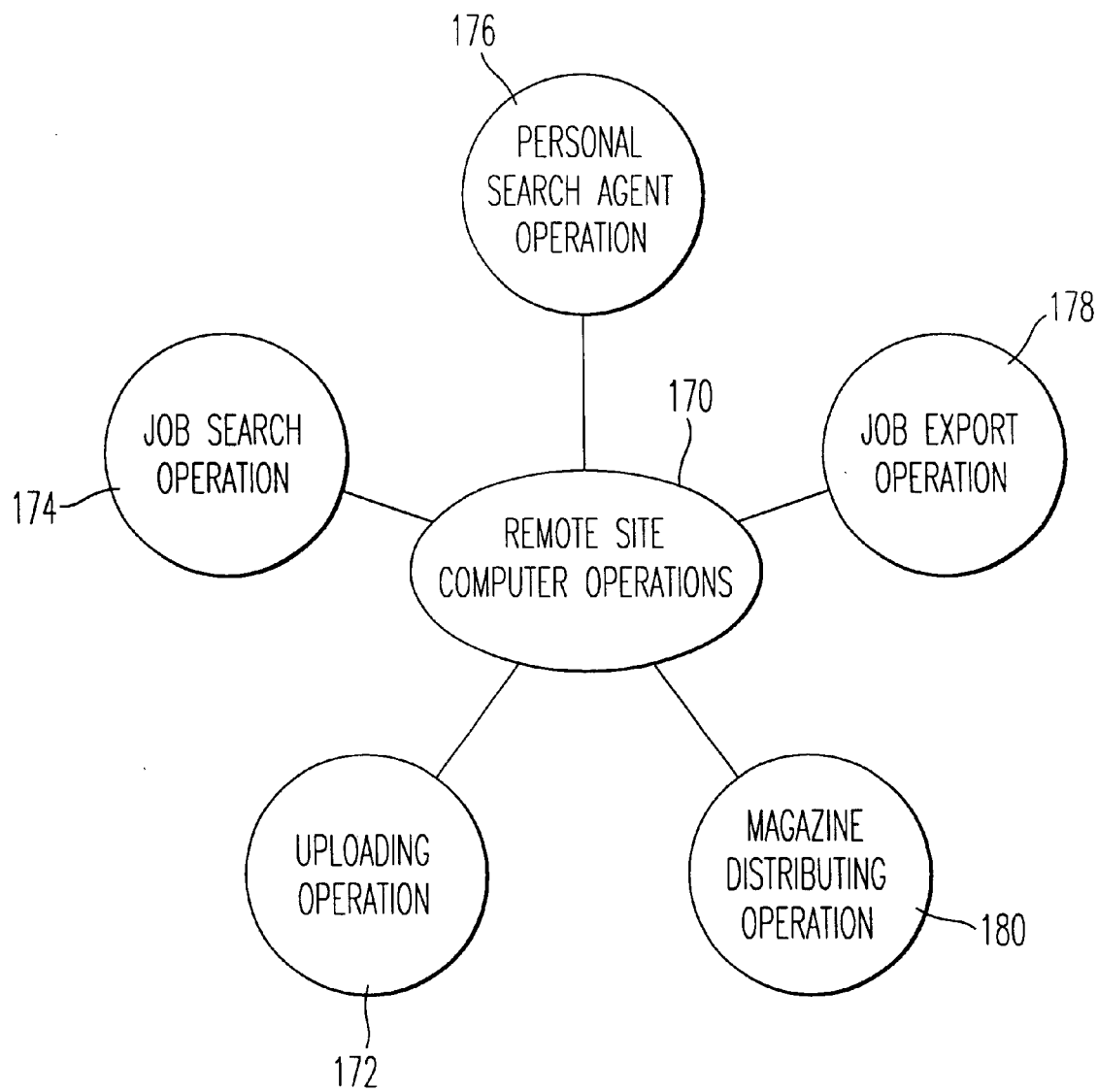
FIG. 20 is a state diagram showing an example of operations performed by a computer running another software program according to the embodiment of the present invention.

As shown in FIG. 20, which is a state diagram illustrating examples of the operations 170 that the remote site computer program controls the remote site computer 44 to perform, the remote site program is capable of controlling the remote site computer 44 to perform an uploading operation 172 in which a computer readable file is uploaded from the company computer 42. As further illustrated, the remote site program controls the remote site computer 44 to perform a job search operation 174, a personal search agent operation 176, a job export operation 178 and a content magazine operation 180, all of which are described in detail below.

Figure 21:
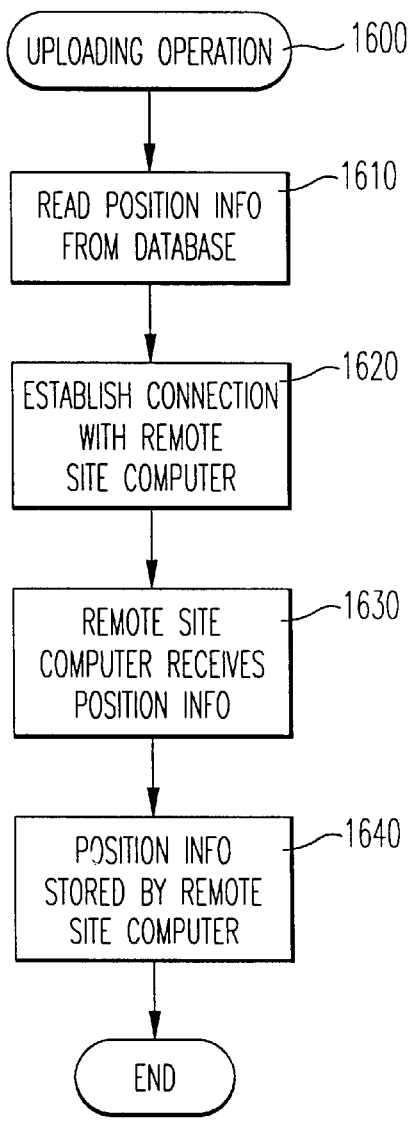
FIG. 21 is a flowchart illustrating an example of a sequence of steps performed by the computer when performing the upload to a specific remote site operation shown in FIG. 2.

As indicated in the flowchart illustrated in FIG. 21, when the company site program controls the company computer 42 to perform the uploading process 53 (FIG. 2) beginning in step 1600, the program in step 1610 controls the computer 42 to read the database in which the position information is stored. In step 1620, the company site program will then control the company computer 42 to establish a connection, such as a TCP/IP connection or an SMTP mail connection, with the remote site computer 44, by which the portion of the computer readable file including the position information is uploaded to the remote site computer 44. It is noted that not all of the detailed information pertaining to the positions is uploaded to the remote site computer 44. Rather, as described below, the portion of the position file including such detailed information is maintained by the company computer 42. Also, it is noted that in step 1620, the company site program can control the company computer 42 to send the portion of the position information file to the remote site computer 44 via e-mail.

Figure 22:
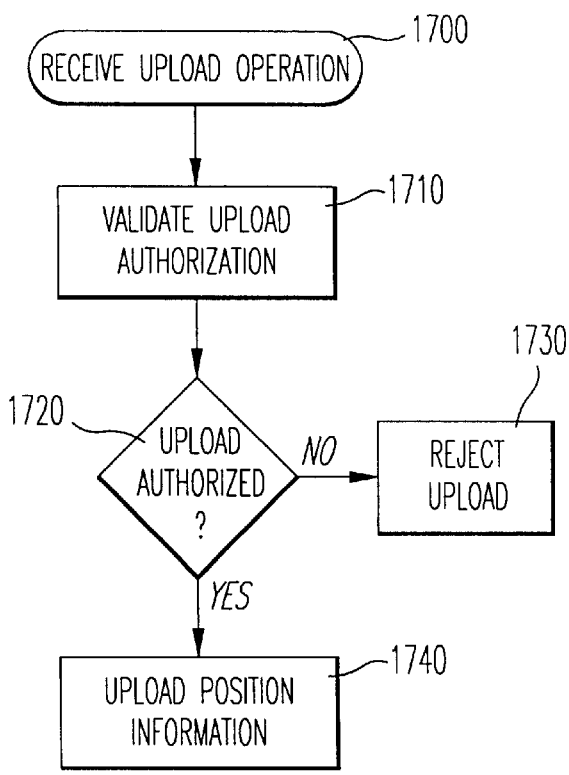
FIG. 22 is a flowchart showing an example of a sequence of steps performed by a computer when performing the uploading operation shown in FIG. 20.

The uploaded portion of the computer readable file is then received by the remote site computer 44 in step 1630 and stored by the remote site computer 44 in step 1640 in the manner shown in the flowchart of FIG. 22. Specifically, in performing the uploading operation beginning at step 1700, the remote site program controls the remote site computer 44 to perform a validation operation in step 1710 to determine whether uploading of the computer readable file from the company computer 42 is permitted.

If the remote site computer 44 in step 1720 ascertains that the uploading is not permitted, the computer 44 will reject the file in step 1730 and thus, refrain from uploading the file. However, if the remote site computer 44 determines in step 1720 that uploading of that particular file is permitted, the file uploading is completed in step 1740, and the file stored in place of any previously stored file including information pertaining to the positions available at company 41. It is noted that the data is stored as records in a database with data elements corresponding to certain fields in the uploaded data. That is, the job postings each can be stored as individual records in the database with data elements corresponding to certain fields (e.g., salary, location and so on) of the record. The remote site computer 44 then generates a Web site on which the positions are listed and accessible by a job seeker.

Figure 23:
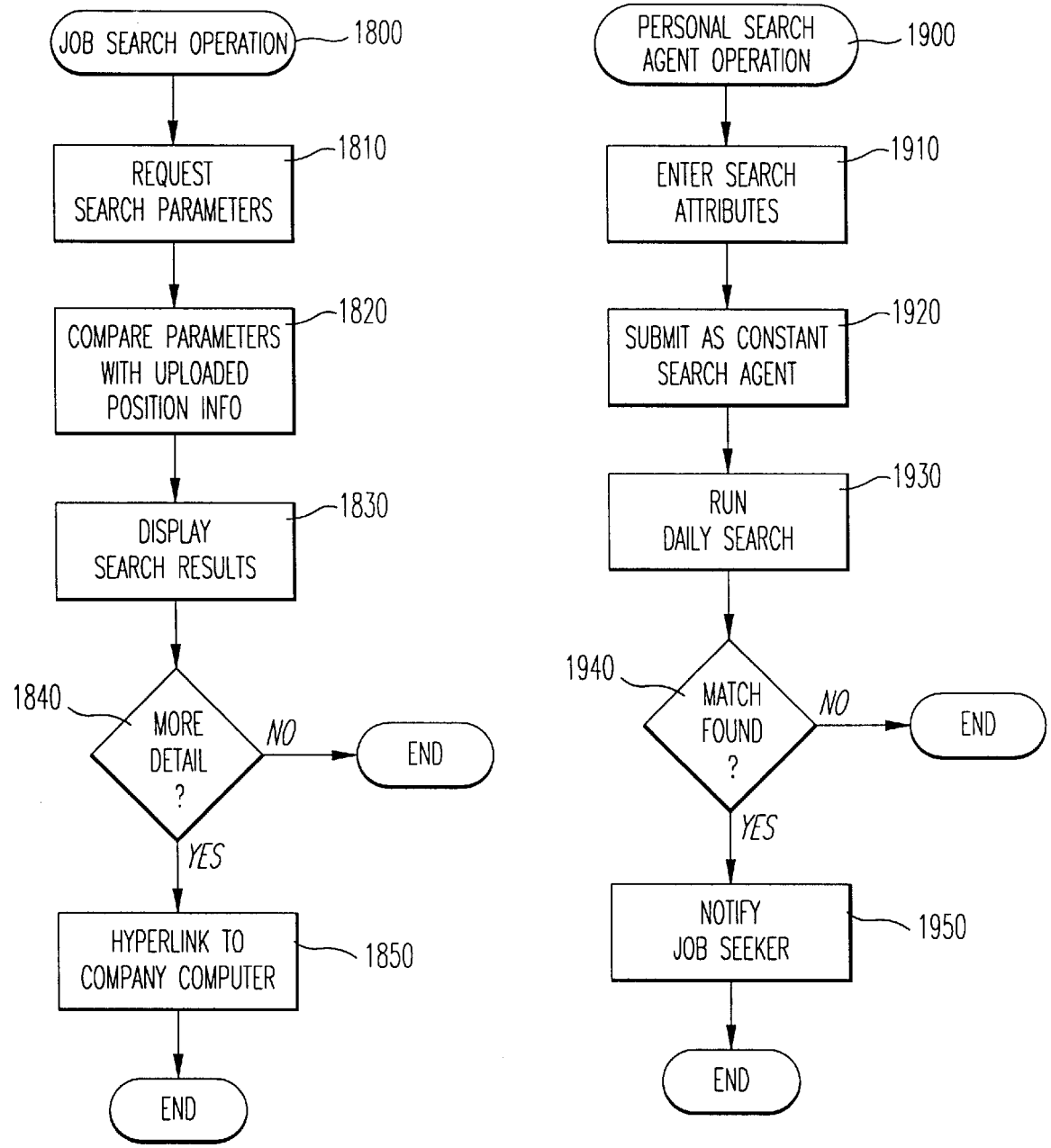
FIG. 23 is a flowchart showing an example of a sequence of steps performed by the computer when performing the job search operation shown in FIG. 20.
Figure 24:
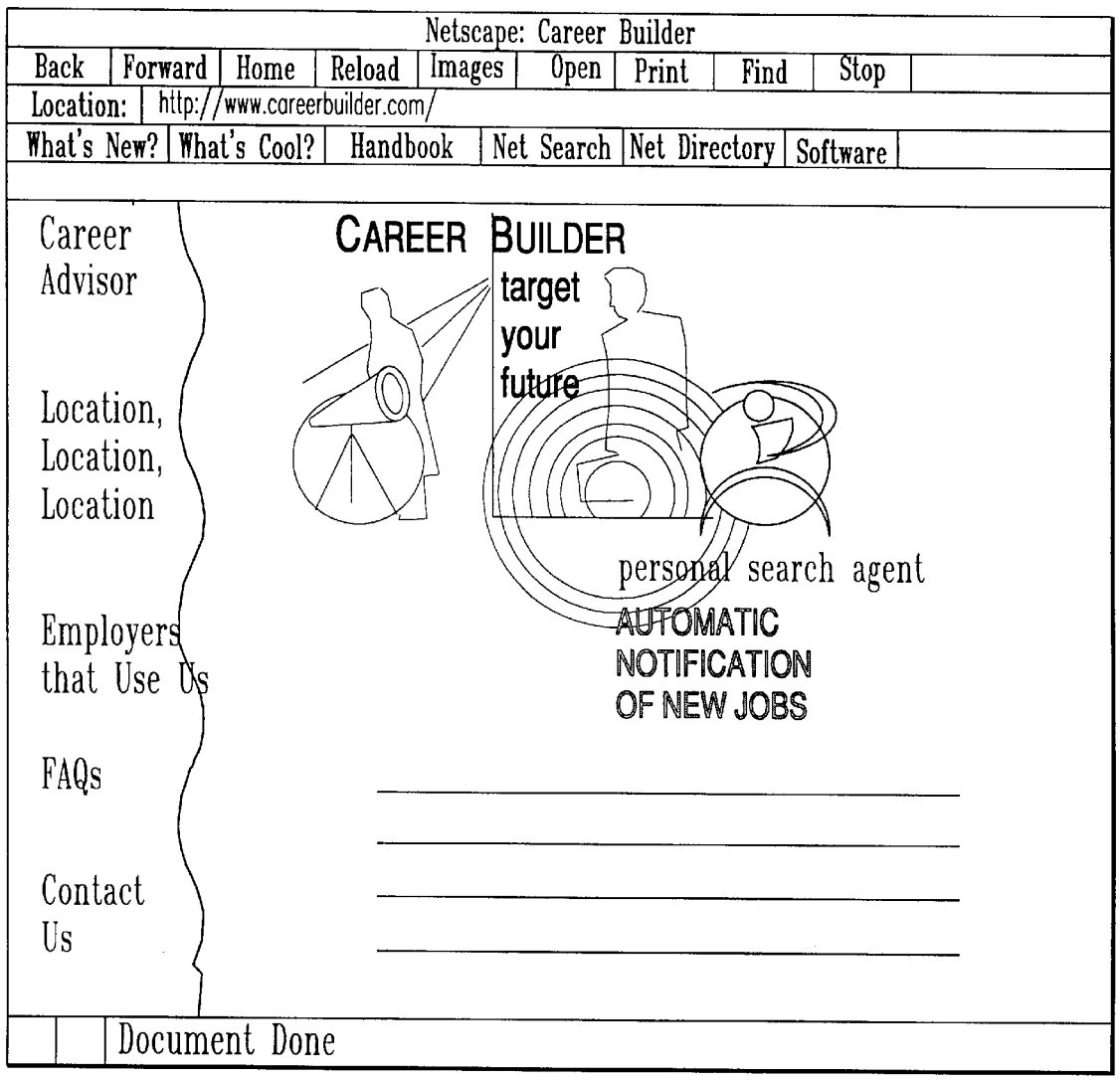
FIG. 24 is an example of a page of a Web site created by the computer performing the operations shown in FIG. 20.

The program being run by the remote site computer 44 generates a search page on its Web page which enables a job seeker to enter information pertaining to a particular position in which he or she is interested, and will control the remote site computer 44 to search the posted positions for positions compatible with that information. Specifically, in performing the job search operation 174 beginning at step 1800 shown in FIG. 23, the job seeker will access the remote Web site hosted by the remote site computer 44 running the remote site computer program. FIG. 24 illustrates an exemplary first page 185 of the remote Web site.

In step 1810, the remote Web site will provide instructions to the job seeker soliciting information from the job seeker pertaining to the position in which the job seeker is interested. That information may include, for example, type of position, salary expectations, geographic location and the like. In step 1820, the remote site program will control the remote site computer 44 to compare the entered information with the uploaded information pertaining to the posted positions to determine whether any of the positions are compatible with the job seeker's request.

If one or more matching positions are found, the remote site program will control the remote site computer 44 in step 1830 to display the results of the comparison on the remote Web page. For example, if the job seeker is looking for a sales representative position, the remote Web site will display a summary listing of sales representative positions available at the company 42 from which the position information file has been uploaded.

If the job seeker is not interested in investigating that position further, the remote site program in step 1840 will stop any further searching or displaying operation, and will allow the listed information to be displayed on the Web site. However, if the job seeker is interested in receiving more information about an available matching position, the job seeker can select that particular position (e.g., by manipulation of the mouse on the job seeker's computer, or in any other suitable manner). The remote site computer 44 will detect this selection in step 1840 and, in step 1850, the remote site program will control the remote site computer 44 to release the job seeker's computer 40 while hyperlinking the job seeker's computer 40 directly to the Web site generated by the company computer 42.

Accordingly, the job seeker can access this additional information pertaining to the matching position directly from the Web site generated by the company computer 42 without intervention by the remote site computer 44. The remote site computer 44 therefore need not continue servicing the job seeker computer 40 unless the job seeker returns to the remote Web site.

When the job seeker is linked to the Web site generated by the company computer 42, the job seeker can peruse the information pertaining to the particular position that he or she has selected which was found as a result of the search performed by the remote site computer 44 hosting the remote Web site. The Web site generated by the company computer 42 will generate a display screen allowing the job seeker an option of forwarding an e-mail or a resume to the company 42 to apply for that available position.

The off-site program is also capable of controlling the off-site computer 44 to perform a personal search agent operation 176 (FIG. 20) for the job seeker beginning at step 1900 in FIG. 25. Specifically, if the job seeker select this feature, the information at the remote Web site, which has been created by the remote site computer 44, causes the job seeker's computer 40 in step 1910 to display on its display screen instructions for the job seeker to enter information pertaining to the position in which the job seeker is interested. The job seeker can also enter information in step 1920 indicating that the "search agent" is to be a constant search agent which monitors new position postings on, for example, a daily basis.

When the information has been entered by the job seeker in steps 1910 and 1920, the remote site program will then control the remote site computer 44 in step 1930 to compare, on a daily basis, the entered position information with the information pertaining to the positions which has been uploaded to the remote site computer 44 and stored in a data base. If the remote site computer 44 determines in step 1940 that no match between the entered data and the uploaded position information has occurred, no action will be taken.

However, if the computer 44 determines that a match has occurred, the remote site program will control the computer 44 in step 1950 to send a message, such as an e-mail message, to the job seeker's computer 40. The message includes, for example, the names of the positions and their corresponding companies. The e-mail message further includes hyperlinks embedded therein. Hence, the job seeker can hyperlink to that company's Web site in the manner described above to explore additional information pertaining to the available position. The job seeker can also forward his or her resume to the company 41 via e-mail, facsimile or regular mail, as desired.

Figure 26:
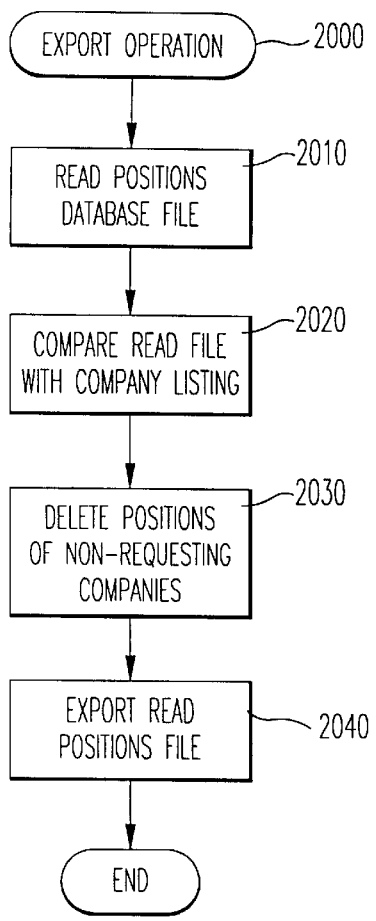
FIG. 26 is a flowchart illustrating an example of a sequence of steps performed by a computer when performing a job export operation shown in FIG. 20.

Additionally, the remote site program which is run by the remote site computer 44 is capable of controlling the computer 44 to export the uploaded positions to an external site. Specifically, in the exporting operation 178 (FIG. 20) beginning at step 2000 in FIG. 26, the remote site program controls the remote site computer 44 in step 2010 to read from the database a file including the position information that has been uploaded from company computers 42. In step 2020, the remote site program controls the remote site computer 44 to compare the companies included in the read database to a previously stored list of companies wanting their position information to be exported to other external sites.

The remote site program will control the computer 44 in step 2030 to delete from the read file those positions of companies which do not want their position information exported. Then, in step 2040, the remote site program will control the computer 44 to export the read file to external site computers via the Internet.

Figure 27:
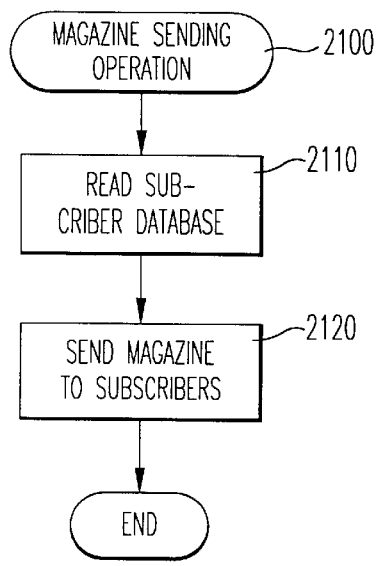
FIG. 27 is a flowchart showing an example of a sequence of steps performed by a computer when performing the magazine distributing operation shown in FIG. 20.

The remote site program is also capable of controlling the remote site computer 44 to send a "magazine" to a subscriber electronically over the Internet. For example, in the magazine sending process 182 (FIG. 20) beginning in step 2100 in FIG. 27, the remote site program controls the computer 44 to read a file including a list of subscribers from a database. In step 2120, the remote site program controls the remote site computer to send the magazine electronically over the Internet to the computers of those subscribers on the list.

Figure 28:
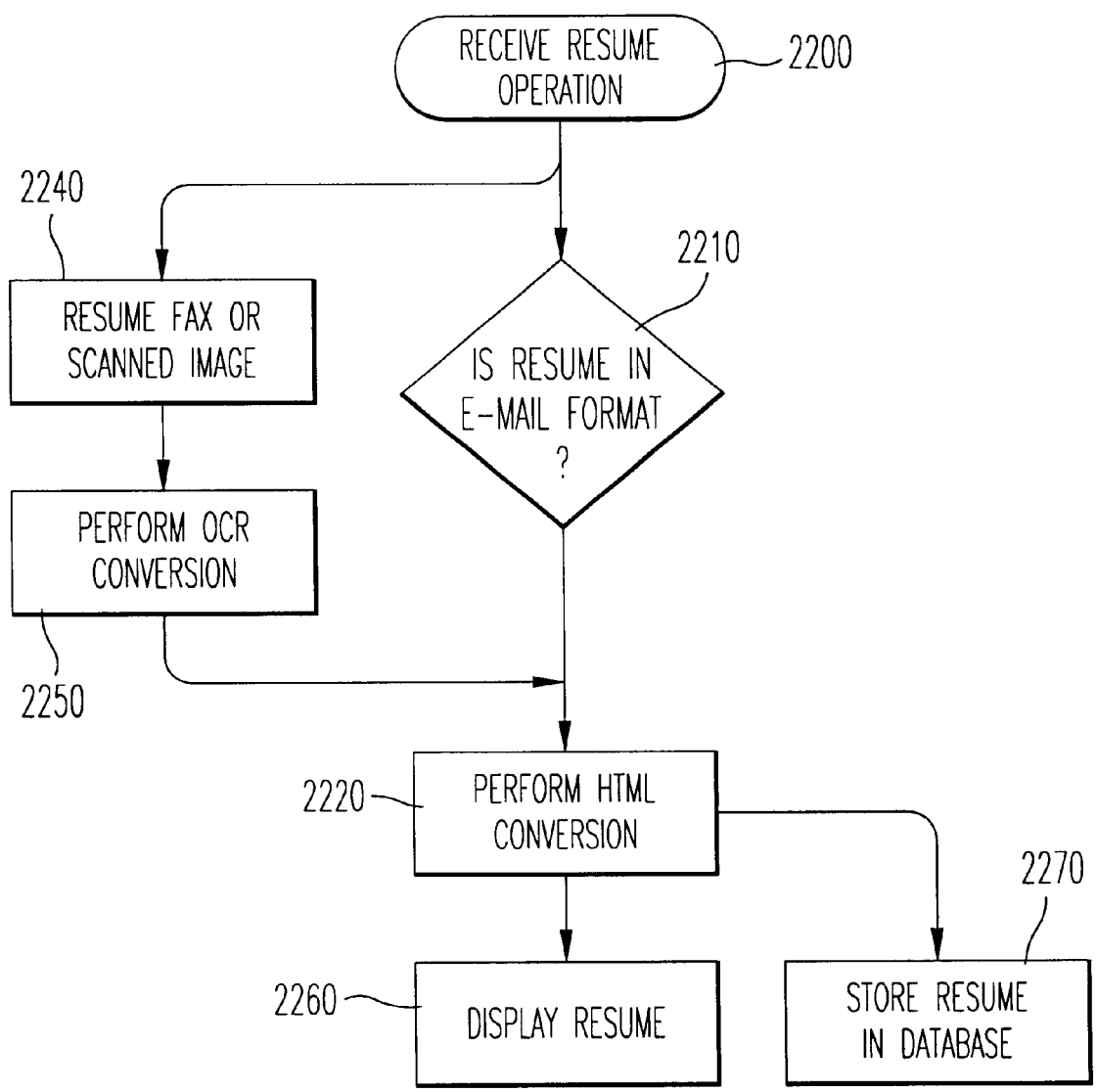
FIG. 28 is a flowchart showing an example of a sequence of steps performed by a computer when performing the receive resume operation shown in FIG. 2.

Turning now to the handling of resumes by the company computer 42, it is noted that the company site program controls the company computer 42 to perform the operations 48 and 50 (FIG. 2) of receiving and handling the resume beginning at step 2200 in FIG. 28. The company site program can be configured to control the company computer 42 to automatically send an e-mail to the job seeker informing the job seeker that the resume has been received. The company site program will then control the computer 42 to determine in step 2010 whether the received resume is in e-mail format.

If the resume is in e-mail format, or any popular word processing format, such as Microsoft™, Word™ or WordPerfect™ (e.g., sent as an attachment to the e-mail), then the company site program will control the company computer 42 to perform an HTML and text conversion process on the data representative of the resume in step 2020 before the resume is stored in the database in step 2030. If the resume is not in an e-mail format, but rather has been determined in step 2040 to have been received as a fax or scanned image, an OCR conversion will be performed in step 2050 prior to the HTML and text conversion step so that the converted resume can be stored in the database in step 2030.

Figure 29:
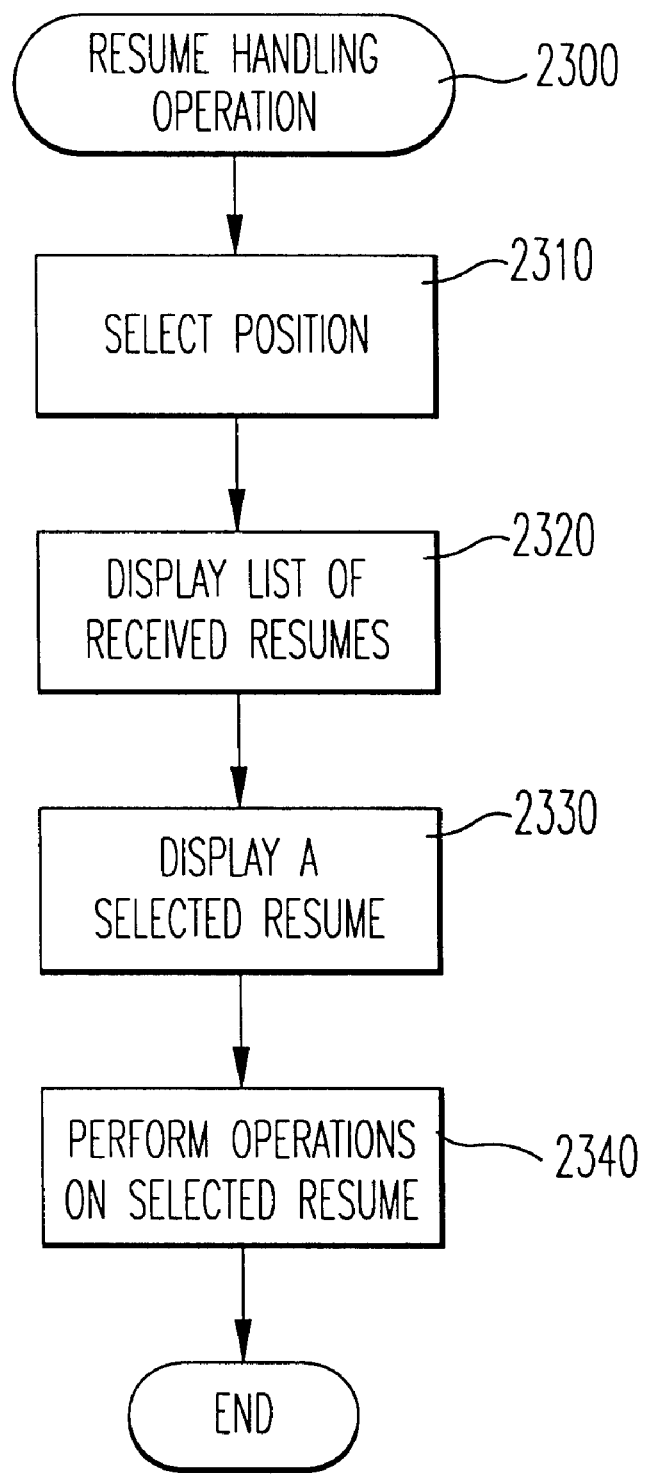
FIG. 29 is a flow chart showing an example of a sequence of steps performed by a computer when performing the manage resumes operation shown in FIG. 2.

The company site program will typically control the company computer 42 to store the resume in relation to the position for which the job seeker is applying, and further, in relation to the hiring contact responsible for that position. Hence, if the job seeker is applying for a sales representative position, the resume will be stored in a file which relates to that sales representative position. The company site program can control the company computer 42 in step 2060 to access and display a stored resume on its display screen. An example of the resume displaying and handling process is described beginning at step 2300 in the flow chart shown in FIG. 29.

Figure 30:
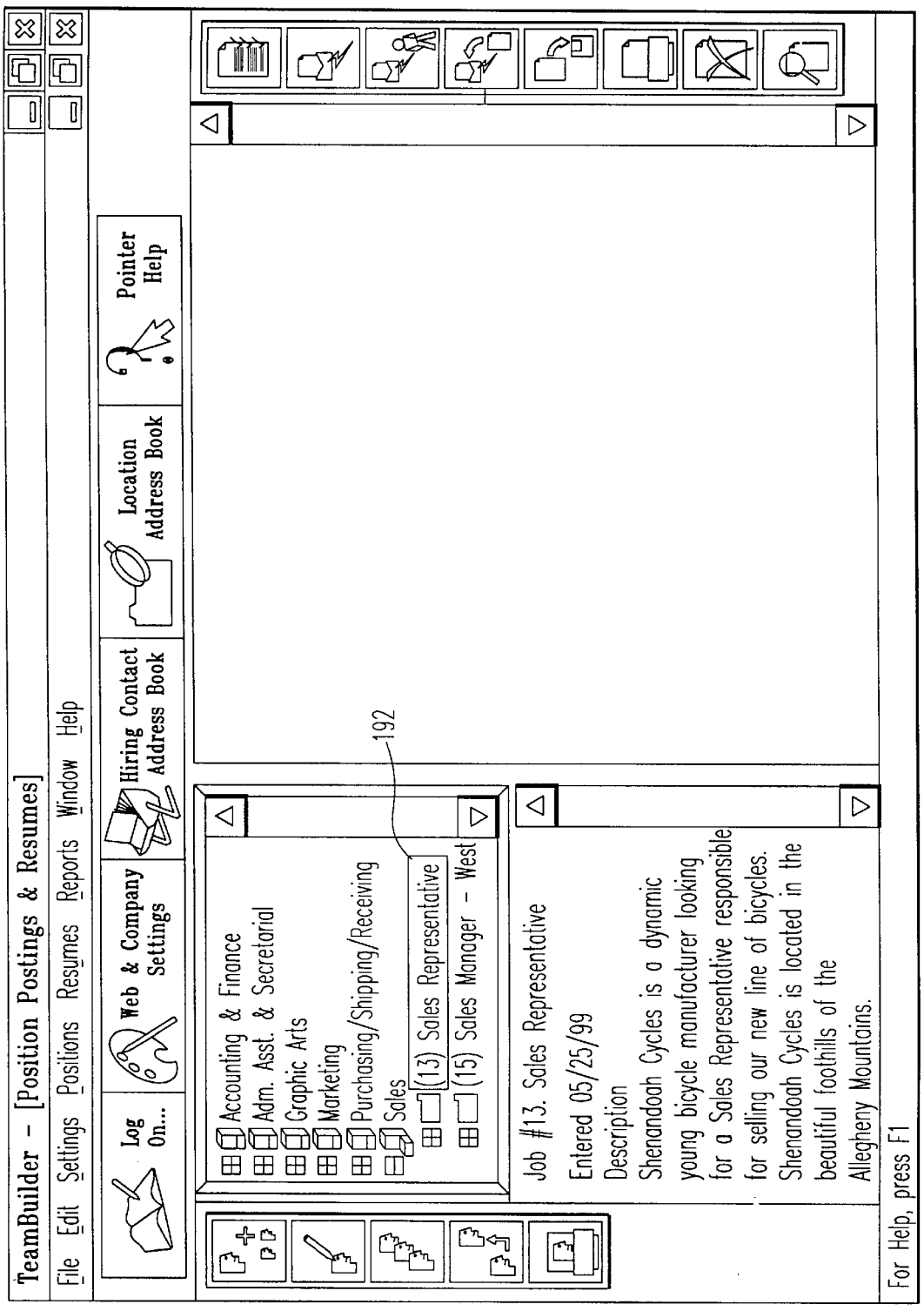
FIG. 30 is an example of a display screen generated by a computer performing an operation of selecting a resume for display according to the steps of the flowchart shown in FIG. 29.

In viewing a screen as shown, for example, in FIG. 4, the hiring contact in step 2310 will select the position for which he or she wishes to view received resumes in a manner similar to that described above with regard to steps 1030 and 1070 in FIG. 3. For example, if the hiring contact wishes to view the resumes received for the sales representative position, the company site program will control the company computer 42 to display on its display screen a screen display 190 as shown, for example, in FIG. 30. A brief description 192 of the position appears on a portion of the screen display 190.

Figure 31:
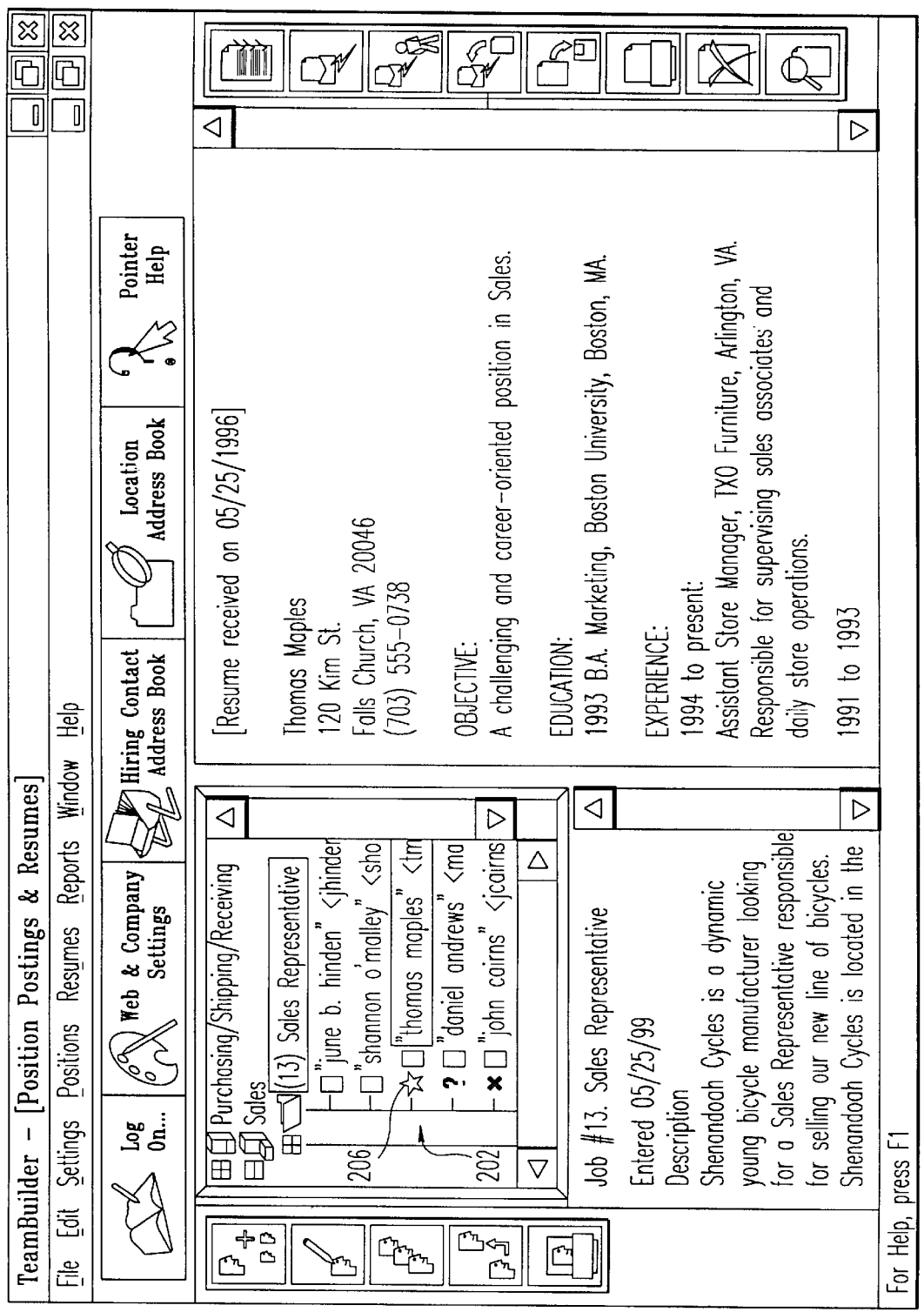
FIG. 31 is an example of a display screen generated by a computer performing the operation of displaying a resume according to the steps of the flowchart shown in FIG. 29.

In step 2320, the hiring contact can then select the position to cause the company site program to control the computer 42 to display on its display screen a screen 200 including a list 202 of resumes received for that position as shown, for example, in FIG. 31. The resumes are listed by name of applicant. The hiring contact can then select a particular resume for display in step 2330, and the company site program will control the computer 42 to display the resume on a portion 204 of the screen as shown in FIG. 31.

Once a resume has been selected, in step 2340 the hiring contact can utilize the control keys on the resume tool bar 66 as shown, for example, in FIG. 7, to manipulate the resume as desired. For instance, the hiring contact can rate on score the resume to indicate whether the applicant is suitable for the position. To do this, the hiring contact will select the score resume key 90 of the resume tool bar 66. Upon selection of the score resume key 90, the company site program will control the computer 42 to display on its display screen a screen display 210 as shown in FIG. 32. The hiring contact can then enter information in response to the displayed information on the screen to score the resume in the appropriate manner depending on the suitability of the candidate for the position. The scoring will appear as a mark 206 next to the resume as shown, for example, in FIG. 31.

Figure 33:
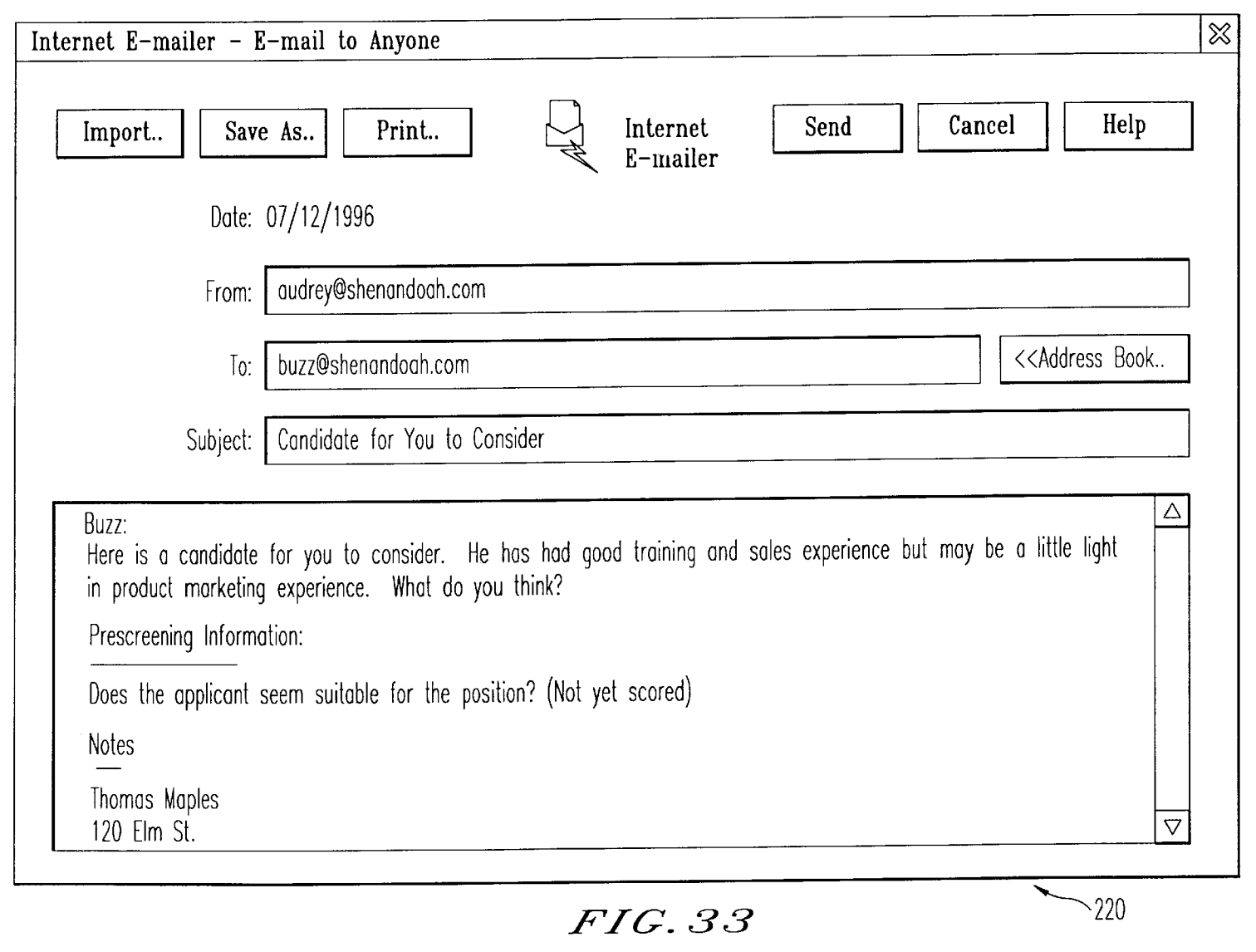

A selected resume can also be e-mailed to anyone with an Internet e-mail address. To perform this function, the hiring contact will select the e-mail resume control key 92 on the resume tool bar 66, which causes the program to control the computer 42 to display on its display screen a screen display 220 as shown in FIG. 33. The hiring contact can then enter in the spaces provided on the screen display 220 the Internet e-mail address of the person to which the resume is to be sent.

Figure 34:
FIG. 34 is an example of a display screen generated by a computer performing an operation for e-mailing a resume to another user as discussed with regard to the flowchart set forth in FIG. 29.

A selected resume can also be sent via e-mail to a secondary hiring contact. This secondary contact is defined in advance. When the hiring contact selects the email to secondary contact control key 94 on the resume tool bar 66, the program will control the computer 42 to display on its display screen a screen display 230 as shown, for example, in FIG. 34, with the secondary hiring contact's e-mail address automatically appearing in the "To:" location. The hiring contact can also enter a message to be sent with the resume.

Figure 35:
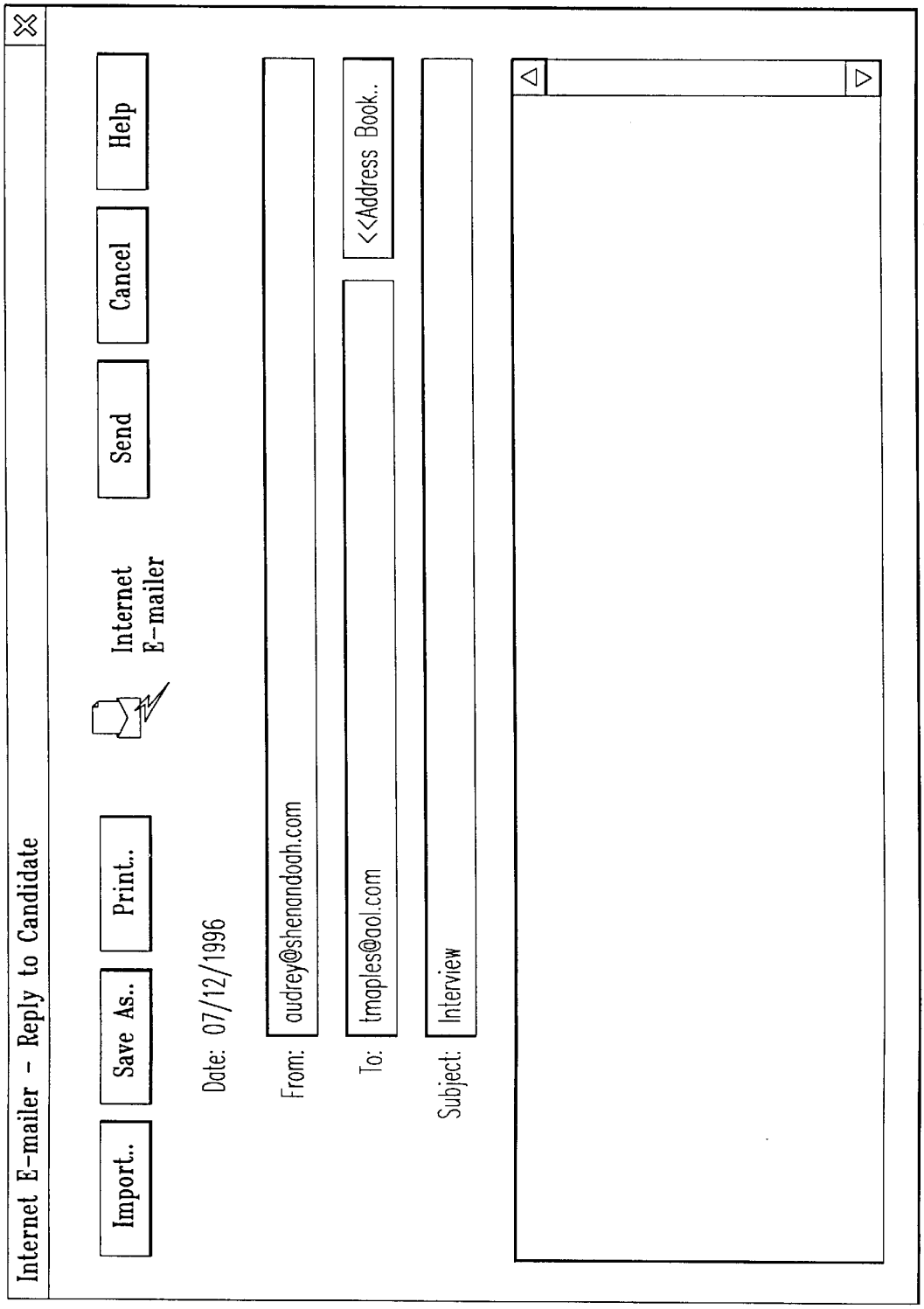
FIG. 35 is an example of a display screen generated by a computer performing an operation for responding to an applicant's resume as discussed with regard to the flowchart set forth in FIG. 29.

The hiring contact can also send a reply to a candidate by selecting the reply to candidate control key 96 of the tool bar 66. In doing so, the company site program will control the computer 42 to display on its display screen a screen display 240 as shown in FIG. 35, with the e-mail address of the candidate automatically appearing in the "To:" section. The hiring contact can then enter a message to the candidate in the box provided. The company site program will control the computer 42 to forward the reply to the candidate in an e-mail format via the Internet. A message, such as a form rejection letter, also can be imported from a database into the e-mail message prior to transmission.

By selecting the export resume to disk key 98 on the resume tool bar 66, the hiring contact can cause the company site program to control the computer 42 to save the selected resume to any particular drive, such as a hard drive, floppy disk, or the like. The selected resume also can be printed by selecting the print resume key 100.

Furthermore, the hiring contact can select the delete resume control key 102 of the tool bar 66 to manually delete the selected resume. Alternatively, the company site program can be configured to automatically delete a resume after a selected period of time from receipt (e.g., 180 days), or to save the resume indefinitely if desired. The resume can also be copied to another position if, for example, the person applying for one position is also qualified for that other position.

Figure 37:
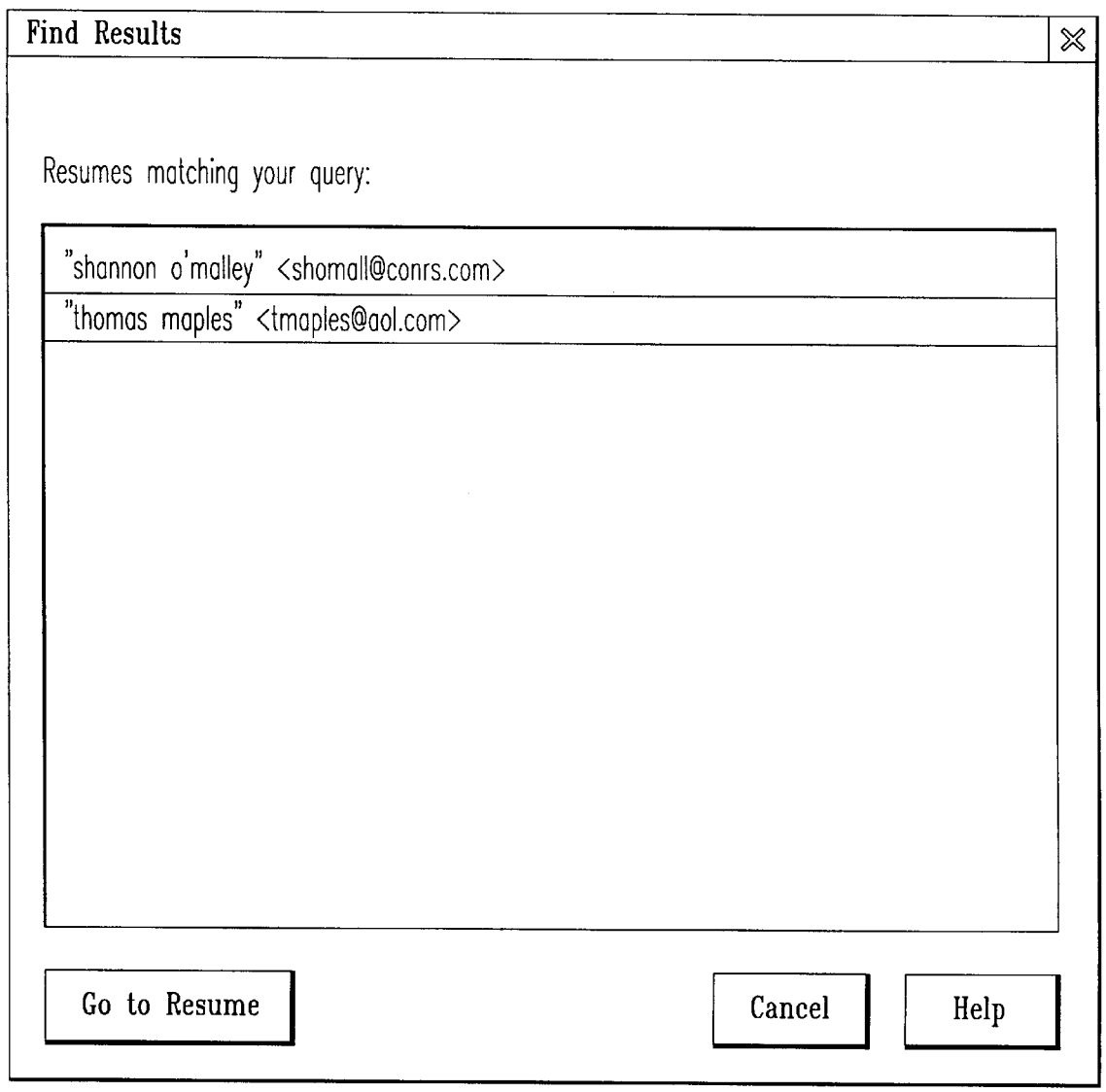
FIG. 37 is an example of another display screen generated by a computer performing an operation for finding a resume as discussed with regard to the flowchart set forth in FIG. 29.

The hiring contact can also search for a particular resume by selecting the find resume control key 104 on the resume tool bar 66. In response to the selection of key 104, the company site program will control the computer 42 to display on its display screen a screen display 250 as shown, for example, in FIG. 36. The hiring contact can then enter the key word information in the location 252 provided on the screen display 250, and the company site program will control the computer 42 to search the resumes in the database to find any which contain that key word. The resumes containing the key word will appear on a screen display 260 as shown in FIG. 37 which is displayed on the display screen of the computer 42. Those resumes can then be selected for display on the display screen of the computer 42. The program further can be instructed by the hiring contact to control the computer 42 to generate a position activity report summarizing the activity for each position.

Figure 38:
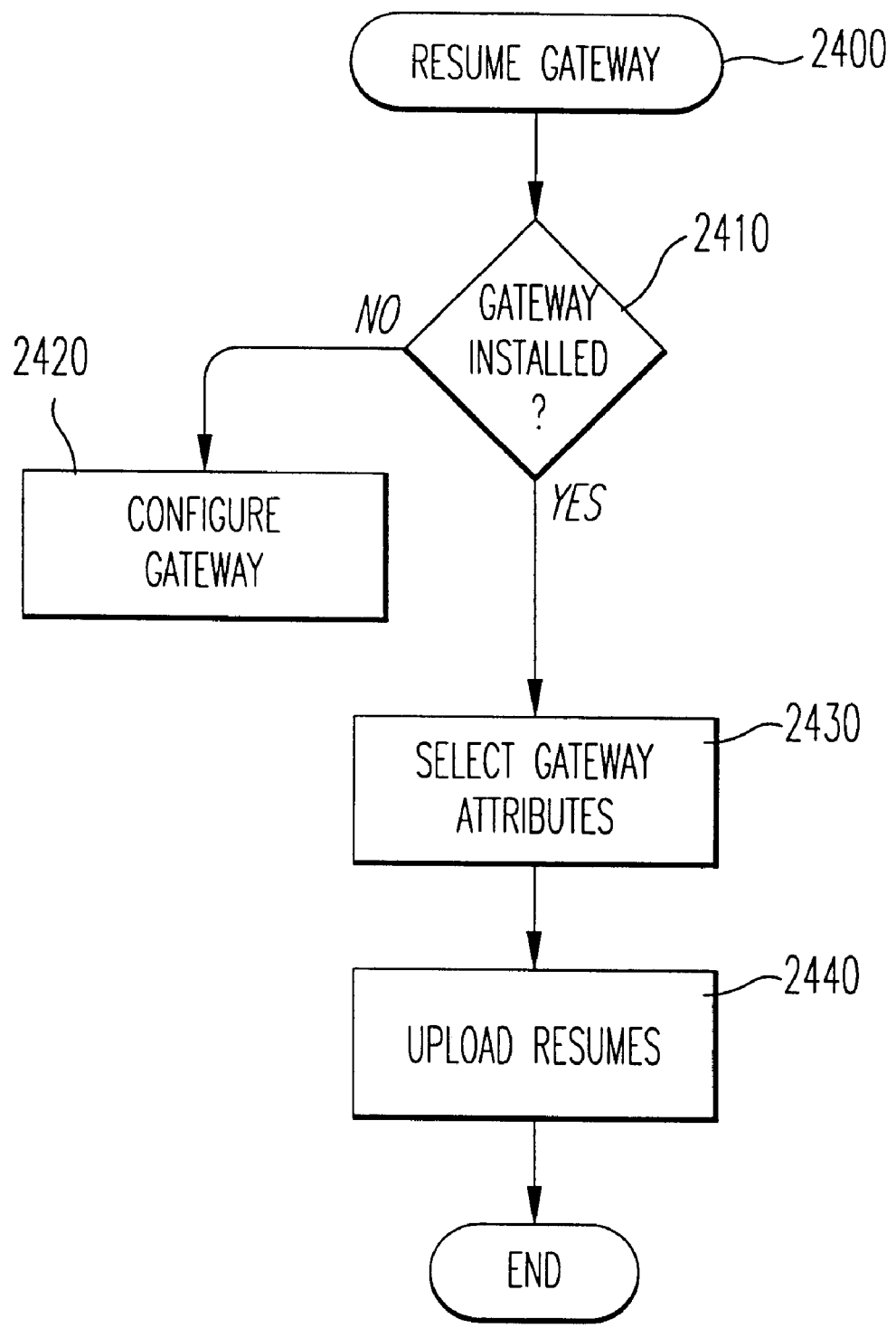
FIG. 38 is a flow chart illustrating a sequence of steps performed by a computer when performing the create resume gateway operation shown in FIG. 2.

The program is further capable of controlling the company computer 42 to perform a resume gateway creating operation 52 (FIG. 2) beginning at step 2400 in FIG. 38. The computer 32 will determine in step 2410 whether an external gateway has been configured giving the company computer 32 access to other sites, such as CareerMosaic, MonsterBoard, and the like, via the Internet. If no gateway has been configured, the program will control the company computer 32 to create a gateway in step 2420.

Once the computer 32 determines that a gateway has been created, the gateway attributes can be configured in step 2430 by a hiring contact. In step 2440, the hiring contact can then select (e.g., by name) the external site or sites to which a computer readable file including the resumes is to be uploaded. Hence, the resumes are effectively copied to the external site or sites.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An employment recruiting method, comprising the steps of:
   receiving first computer readable data, representing information pertaining to a job, provided by a job seeker user via a computer network;
   automatically periodically comparing said first computer readable data to second computer readable data including job opening data representing information pertaining to at least one job opening; and
   sending said job seeker user a message informing said job seeker user when said comparing step determines that said first computer readable data matches at least a portion of said second computer readable data, said message including a link to a site at which additional data pertaining to said job opening is accessible by said job seeker user via said link.

2. An employment recruiting method as claimed in claim 1, wherein:
   said message is an e-mail message.

3. An employment recruiting method as claimed in claim 1, wherein:
   said comparing step compares said first computer readable data to said second computer readable data at periodic intervals as designated by said job seeker user.

4. A method as claimed in claim 1, wherein:
   said comparing step compares said first computer readable data to said second computer readable data in response to a request by said job seeker.

5. A system for performing employment recruiting via a computer network, comprising:
   a data receiving component, adapted to receive first computer readable data, representing information pertaining to a job, is provided by a job seeker user via said computer network;
   a comparator, adapted to automatically periodically compare said first computer readable data to second computer readable data including job opening data representing information pertaining to at least one job opening; and
   an informing component, adapted to provide a message to said job seeker user to inform said job seeker user when said comparator determines that said first computer readable data matches at least a portion of said second computer readable data, said message including a link to a site at which additional data pertaining to said job opening is accessible by said job seeker user via said link.

6. A system as claimed in claim 5, wherein:
   said message is an e-mail message.

7. A system as claimed in claim 5, wherein:
   said comparator compares said first computer readable data to said second computer readable data at periodic intervals as designated by said job seeker user.

8. A system as claimed in claim 5, wherein:
   said comparator is adapted to compare said first computer readable data to said second computer readable data in response to a request by said job seeker.

9. A computer readable medium of instructions, comprising:
   a first set of instructions, adapted to control a computer system to receive first computer readable data, representing information pertaining to a job, provided by a job seeker user via a computer network;
   a second set of instructions, adapted to control said computer system to automatically periodically compare said first computer readable data to second computer readable data including job opening, data representing information pertaining to at least one job opening; and
   a third set of instructions, adapted to control said computer system to send a message to said job seeker user to inform said job seeker user when said first computer readable data is determined to match at least a portion of said second computer readable data, said message including a link to a site at which additional data pertaining to said job opening is accessible by said job seeker user via said link.

10. A computer readable medium of instructions as claimed in claim 9, wherein:
    said message is an e-mail message.

11. A computer readable medium of instructions as claimed in claim 9, wherein:
    said second set of instructions controls said computer system to compare said first computer readable data to said second computer readable data at periodic intervals as designated by said job seeker user.

12. A computer readable medium of instructions as claimed in claim 9, wherein:
    said second set of instructions is adapted to control said computer system to compare said job seeker.

* * * * *